(12) United States Patent
Stephenson

(10) Patent No.: US 7,654,489 B2
(45) Date of Patent: Feb. 2, 2010

(54) LIFTING BODY AIRCRAFT AND REENTRY VEHICLE WITH CHINES

(75) Inventor: Jon C. Stephenson, LaPlace, LA (US)

(73) Assignee: Aviation Dynamics, Corp, LaPlace, LA (US)

( * ) Notice: Subject to any disclaimer, the term of this patent is extended or adjusted under 35 U.S.C. 154(b) by 503 days.

(21) Appl. No.: 11/167,530

(22) Filed: Jun. 27, 2005

(65) Prior Publication Data

US 2007/0018036 A1      Jan. 25, 2007

Related U.S. Application Data

(63) Continuation-in-part of application No. 10/458,142, filed on Jun. 10, 2003, now Pat. No. 6,948,682.

(51) Int. Cl.
*B64G 1/14* (2006.01)
(52) U.S. Cl. .................. 244/159.3; 244/159.1; 244/36
(58) Field of Classification Search .............. 244/36, 244/160, 162, 118.1, 118.5, 159.3, 159.1
See application file for complete search history.

(56) References Cited

OTHER PUBLICATIONS http://www.dfrc.nasa.gov/Newsroom/FactSheets/FS-010-DFRC.html.*
HL-10 Pictures.*

* cited by examiner

*Primary Examiner*—Timothy D Collins
(74) *Attorney, Agent, or Firm*—Roy, Kiesel, Keega & DeNicola

(57) ABSTRACT

A lifting body aircraft suitable for atmospheric flight and/or as a reentry vehicle. The craft has a substantially flat upper surface, a lower surface with a doubly convex first section and a flat sloping second section. Chines may be provided between the upper and lower surfaces. The doubly convex first section allows the craft to have its center of gravity forward of its longitudinal center line. The flat sloping second half of the lower surface and the substantially flat upper surface form the aft end of an airfoil. A pair of vertical stabilizers enhance stability and include rudders which, along with a pair of elevons, provide steerage. The craft may glide or it may have an engine or rockets for thrust. The result is an extremely stable lifting body design that is well suited for launch or conventional take off, insertion, orbital operations, reentry, atmospheric flight, and conventional landings.

34 Claims, 23 Drawing Sheets

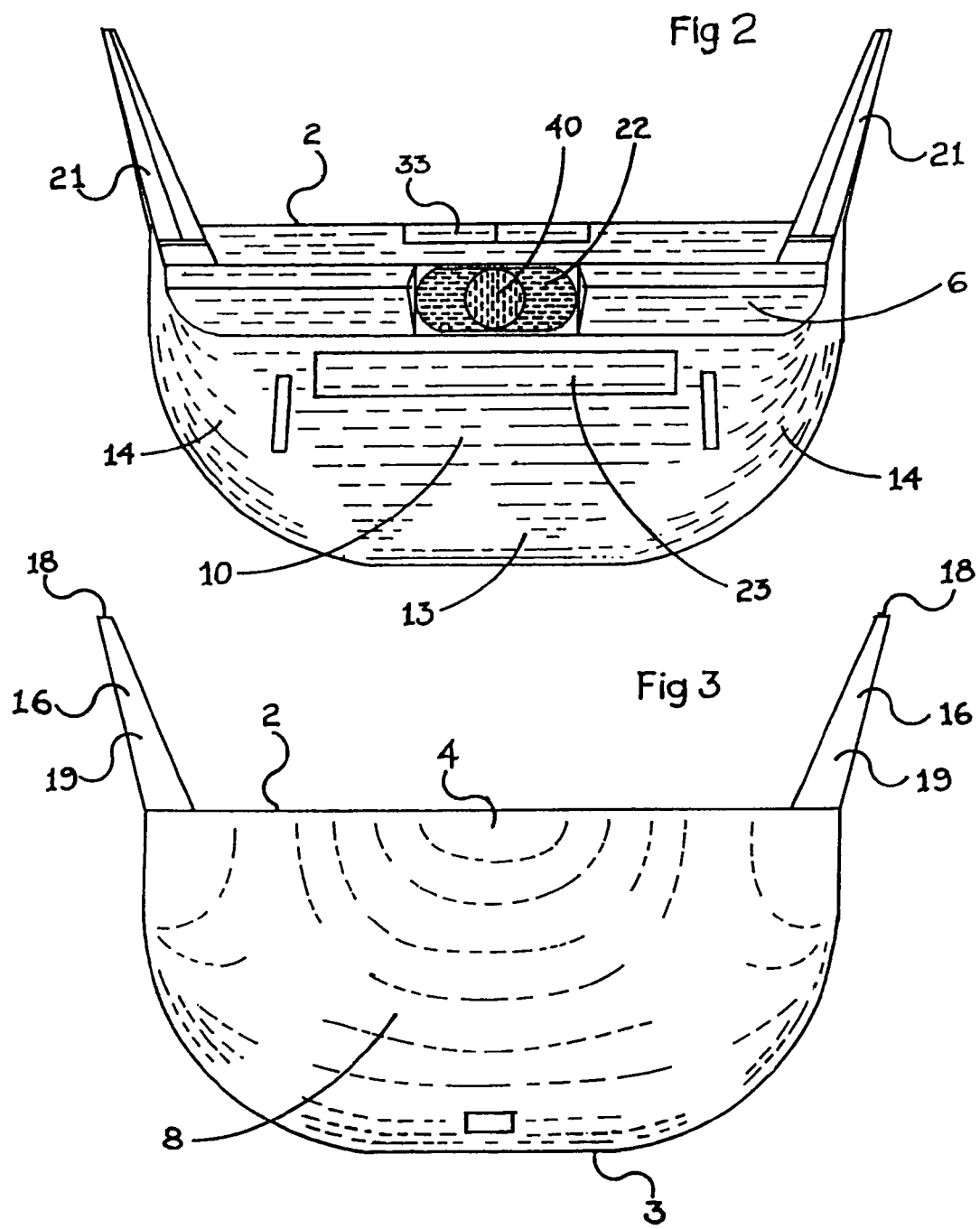

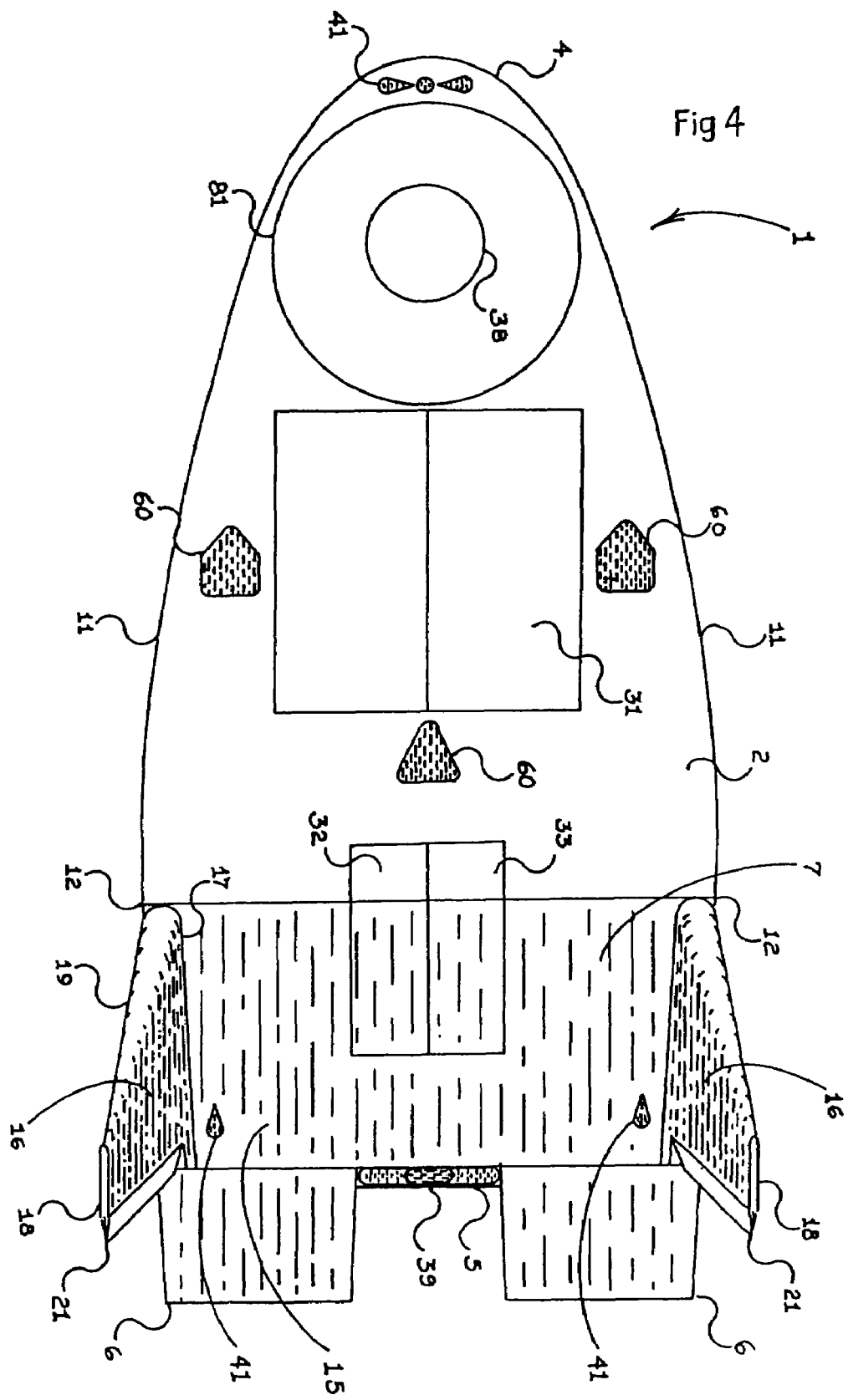

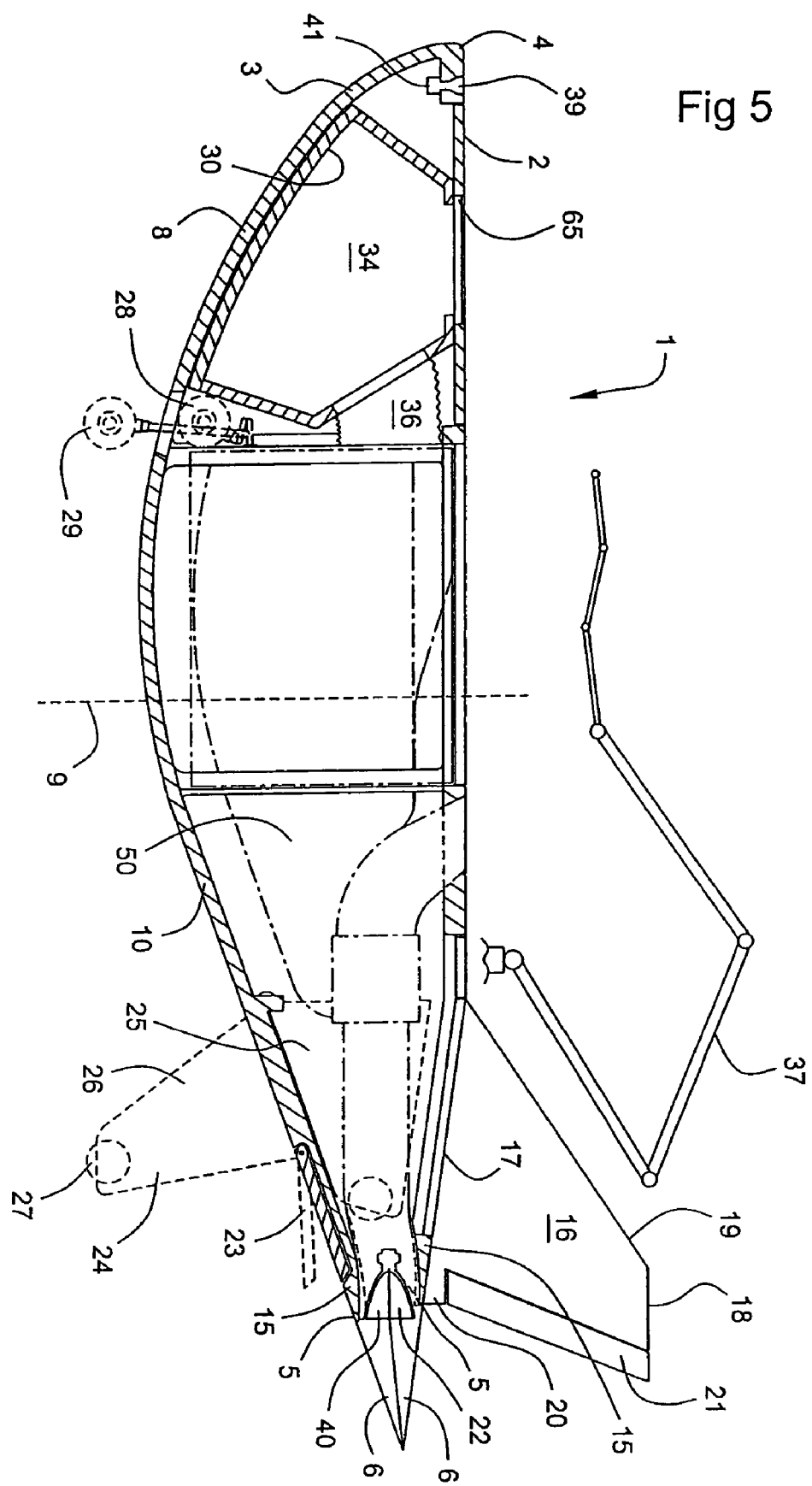

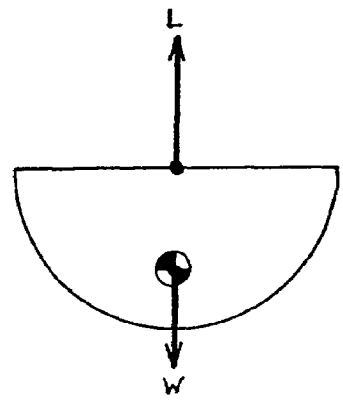 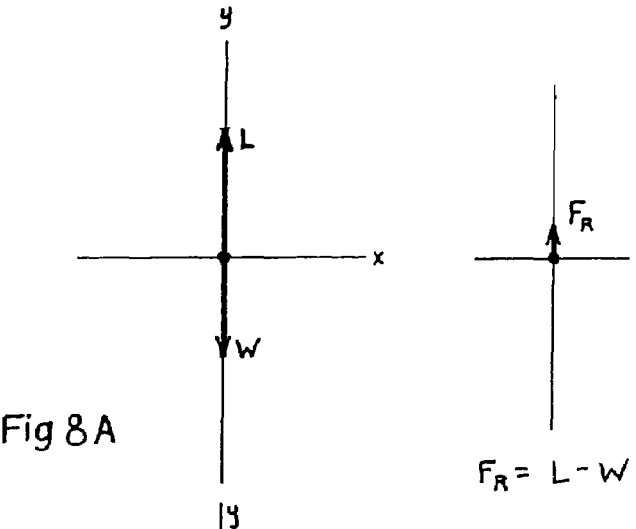
Fig 8A
$F_R = L - W$
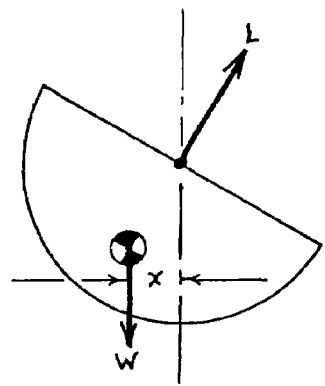 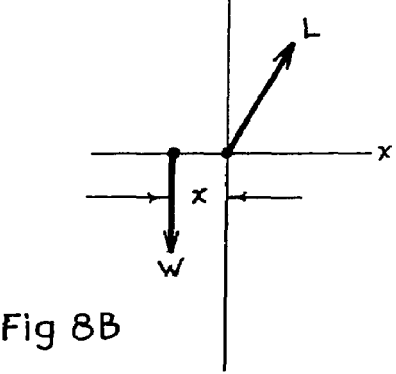
Fig 8B
$M = X(Ly + W)$
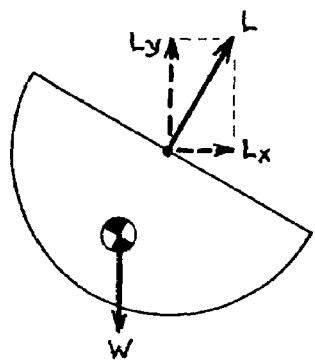 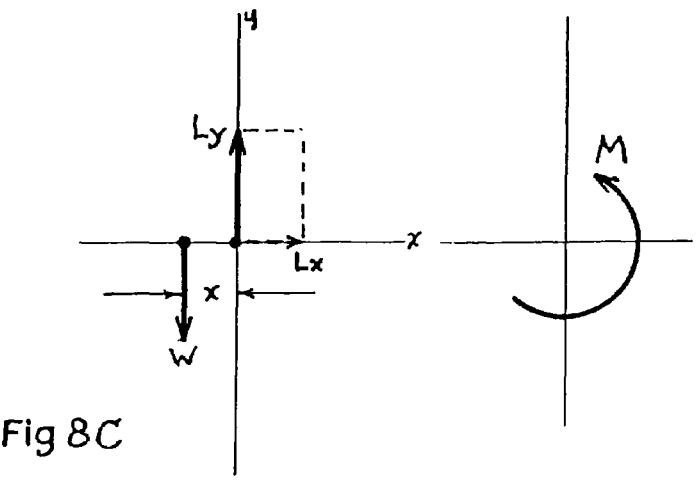
Fig 8C

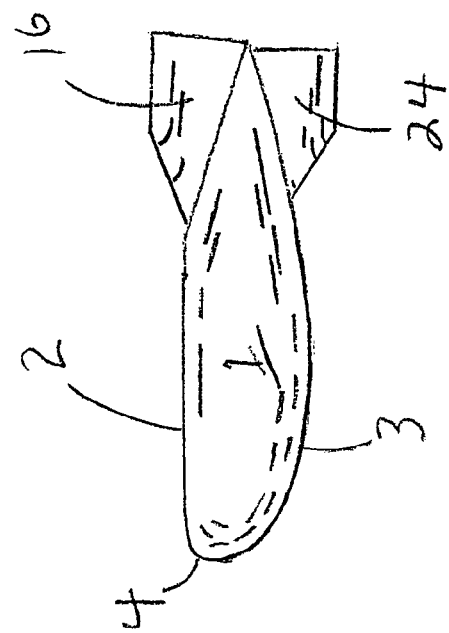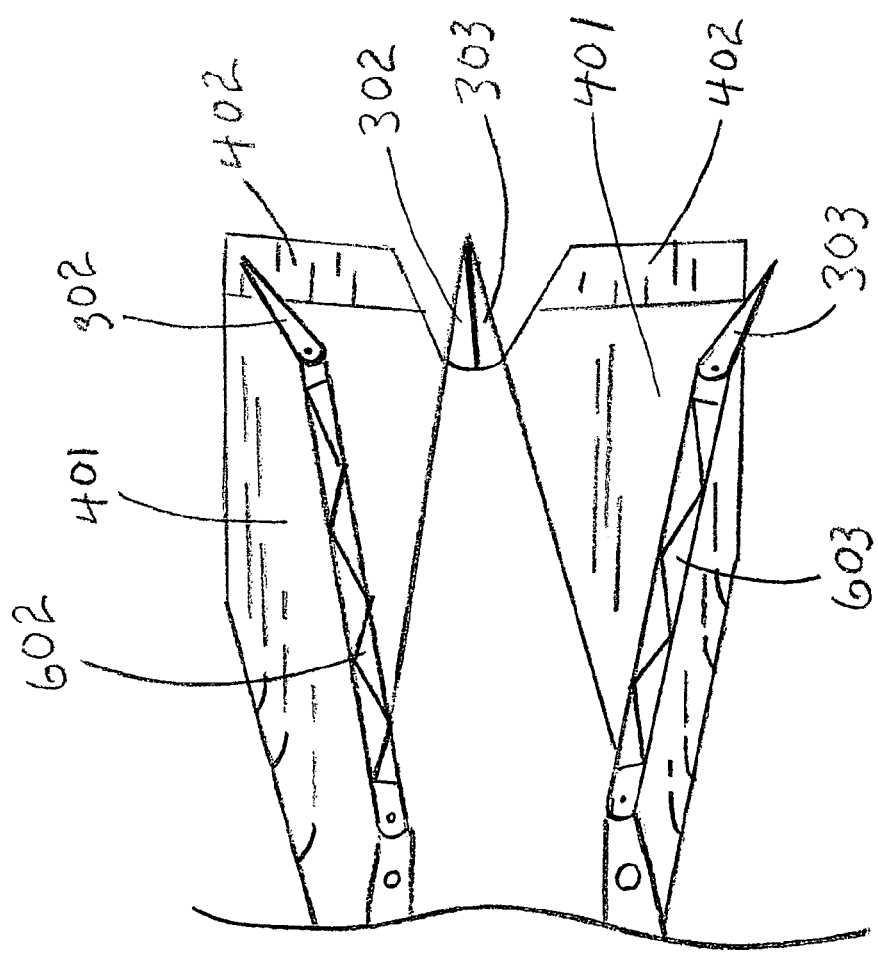
Fig 17 C

LIFTING BODY AIRCRAFT AND REENTRY VEHICLE WITH CHINES

CONTINUATION STATUS

This is a continuation-in-part of allowed U.S. patent application Ser. No. 10/458,142, file Jun. 10, 2003, now U.S. Pat. No. 6,948,682 which is hereby incorporated by reference in its entirety.

BACKGROUND OF THE INVENTION

1. Field of the Invention

The invention relates to aircraft in general and to lifting body aircraft in particular.

2. Prior Art

Lifting body aircraft are known in the art. The theory was pioneered by Dr. Alfred J. Eggers, Jr. who discovered that lift could be generated by modifying the shape of a blunt nose cone reentry vehicle. Eggers' theories led to several NASA and U.S. Air Force experimental aircraft in the 1960's and 1970's, namely the M2-F1, the M2-F2, the M2-F3, HL-10, X-24A and X-24B. Eggers' lift concept can also be seen in U.S. Pat. No. 3,276,722. All of these craft generate lift with the fuselage of the aircraft only; i.e. without a wing.

The Eggers craft can generally be described as conical sections. They have a blunt nose, swept back sides, round bottoms, and generally flat tops. As the crafts move through air, the high profile of their curved lower surfaces causes a significant amount of air to be displaced up and around the body of the vessel. This does two things. First, pressure is being exerted on the air mass at the interface with the hull. In response to this pressure, the air is compressed and it is displaced, up and around the lower surface of the craft. Air has viscosity, so it resists both the compression and the displacement. The greater the speed at which the craft is moving, the greater the resistance of the air. This resistance of the air is transmitted as force to its surroundings. Thus, the air pressure below the craft will be increased.

Second, a lift body is designed to move forward with its nose slightly elevated. As the craft moves forward, the craft will displace air, rarefying (reducing the density of) the air above the craft. This will result in a decrease in pressure above the upper surface of the lifting body.

The difference between the increased pressure generated on the lower surface and the decreased pressure at the upper surface will result in an overall upward force on the lifting body. This upward force is lift.

Although lift bodies were previously known, limited maneuverability and stability of many of the craft in atmospheric flight created significant challenges. Moreover, the inventors are not aware of any that were ever able to takeoff under their own power. Rather, previous lifting bodies were all believed to carried aloft by a winged aircraft and released to perform rocket powered maneuvers and then to return to earth at a glide. Accordingly, a lifting body craft meeting the following objectives is desired.

OBJECTS OF THE INVENTION

It is an object of the invention to provide a lift body aircraft that maximizes lift.

It is another object of the invention to provide a lift body aircraft that minimizes drag.

It is another object of the invention to provide a lift body aircraft that maximizes flight stability.

It is still another object of the invention to provide a lift body aircraft that minimizes the tendency of the aircraft to pitch up.

It is still another object of the invention to provide a lift body aircraft that is readily maneuverable.

It is yet another object of the invention to provide a lift body aircraft that may be used as a reentry vehicle for space flight.

It is still another object of the invention to provide a lift body aircraft optimized for atmospheric flight and space operations.

It is still another object of the invention to provide a lift body aircraft that employs modular internal component systems.

It is still another object of the invention to provide a lift body aircraft that is readily adaptable to a wide range of mission objectives.

It is yet another object of the invention to provide a lift body aircraft that can be landed either under power or "dead stick."

It is still another object of the invention to provide a lift body aircraft suitable for landing on unimproved surfaces.

It is still another object of the invention to provide a lift body aircraft suitable for landing on water.

It is still another object of the invention to provide an airframe for a lift body aircraft formed of a wound carbon construction.

It is still another object of the invention to provide an airframe for a lift body aircraft which maximizes strength and minimizes interfaces.

It is still another object of the invention to provide a lift body aircraft having a single component aeroshell.

It is still another object of the invention to provide a two stage system for delivering a reusable lift body aircraft to orbit.

SUMMARY OF THE INVENTION

The invention comprises a lift body aircraft. The aircraft has an upper surface that is generally flat and a lower surface that is doubly convex in the forward portion but which has a flat bottom over its aft half. The double convexity allows the center of gravity of the aircraft to be positioned forward of its longitudinal center line, giving the craft the inherent flight stability of a "shuttlecock."

At the aft end of the craft, the lower surface and the upper surface will come together to form the aft portion of an airfoil, whereby drag at the rear of the craft may be minimized. The craft is also preferably provided with a pair of vertical stabilizers which serve as winglets to minimize "wingtip" vortexes: turbulent flow of air where the air flowing beneath the craft spills over into the air flow above the craft. The vertical stabilizers may be provided with rudders to assist in controlling the craft. Elevons may also be provided at the aft end of the craft for additional control.

The craft may be used for atmospheric flight. However, the design is also suited for use as a reentry vehicle for space flight. The broad doubly convex nose section provides a wide surface over which the heat and forces inherent in reentry may be dissipated. In the initial stages of reentry, the superheated air through which the craft will pass will be rendered a plasma and will only provide minimal lift in the conventional sense. However, once the craft has slowed sufficiently it will reestablish sufficient lift to be used to fly or glide to a landing at a site of the pilot's choosing, or continue to perform mission objectives which require extended loiter time.

The inventors contemplate that the airframe will be of a single component aeroshell, with modular interior component systems. These internal component systems may include crew modules, control modules, supply modules, cargo modules, satellite modules, medical modules, evacuation modules, science or laboratory modules, propulsion modules, fuel modules, and sub systems modules, or other payload modules. All modules will preferably be designed to be readily installed, removed, and exchanged using standardized mating points and mating adapters. These will allow the vehicle to be efficiently serviced and quickly adapted to changing mission objectives, whether on the ground, in the field, or even on orbit.

BRIEF DESCRIPTION OF THE FIGURES

FIG. 2 is an end view of a preferred embodiment of the invention.

FIG. 3 is a front view of a preferred embodiment of the invention.

FIG. 4 is a top view of a preferred embodiment of the invention.

FIG. 5 is a side cut-away view of a preferred embodiment of the invention.

FIG. 8A is a representative aft end profile view of a preferred embodiment of the invention in flat level flight with the lift vector "L" and gravity induced weight vector "W" shown relative to the craft and then resolved.

FIG. 8B is a representative aft end profile view of a preferred embodiment of the invention shown in FIG. 8A in a roll with the lift vector "L" and gravity induced weight vector "W" shown relative to the craft and then translated onto x-y axes to illustrate displacement.

FIG. 8C is a representative aft end profile view of a preferred embodiment of the invention shown in FIG. 8B with the lift vector "L" resolved into its horizontal and vertical components and showing the resulting restorative roll moment "M."

FIG. 20 is a rear end view of a preferred unmanned embodiment of the invention having chines.

DETAILED DESCRIPTION OF THE BEST MODE

Figure 1:
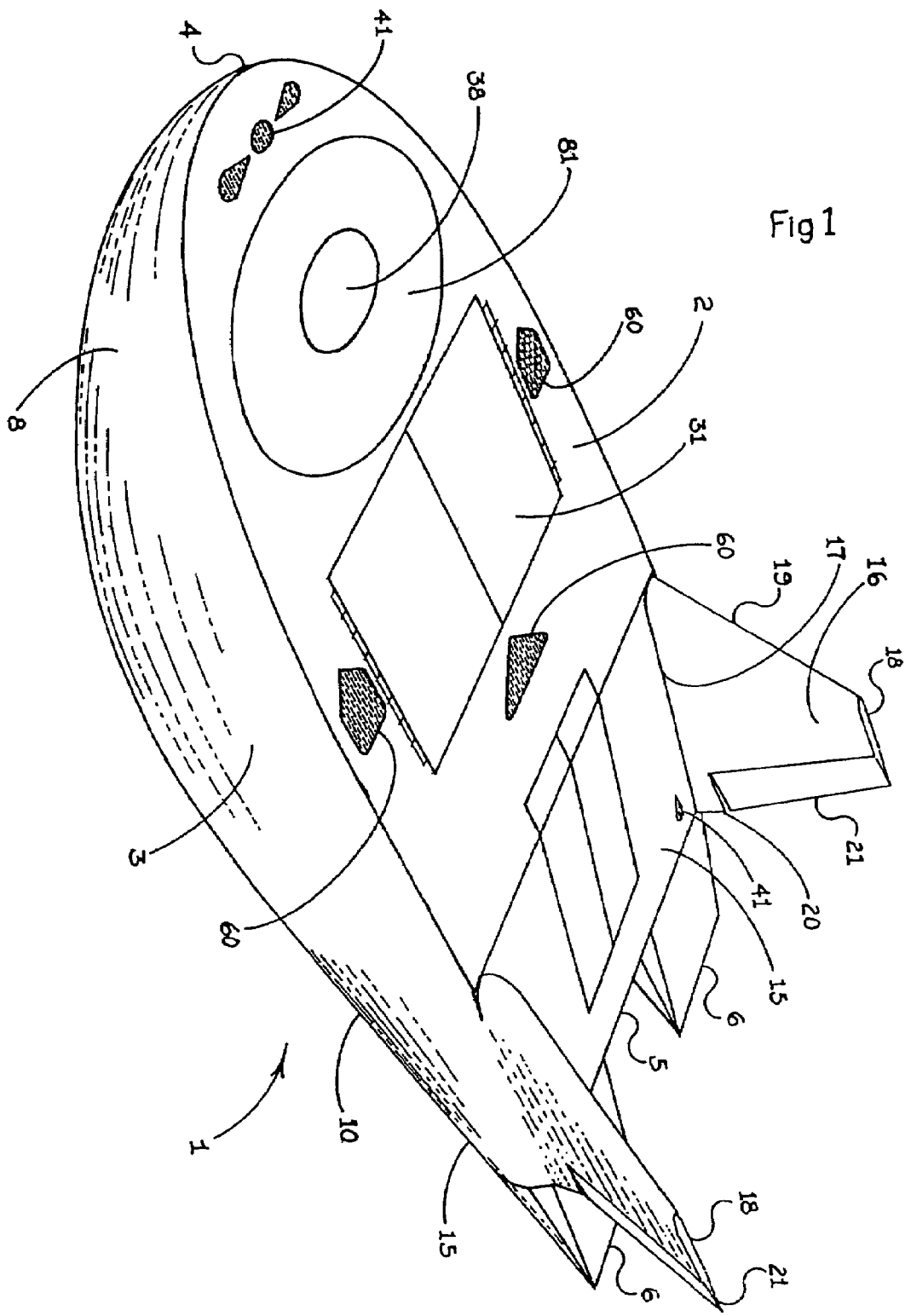
FIG. 1 is a perspective view of a preferred embodiment of the invention.
Figure 6:
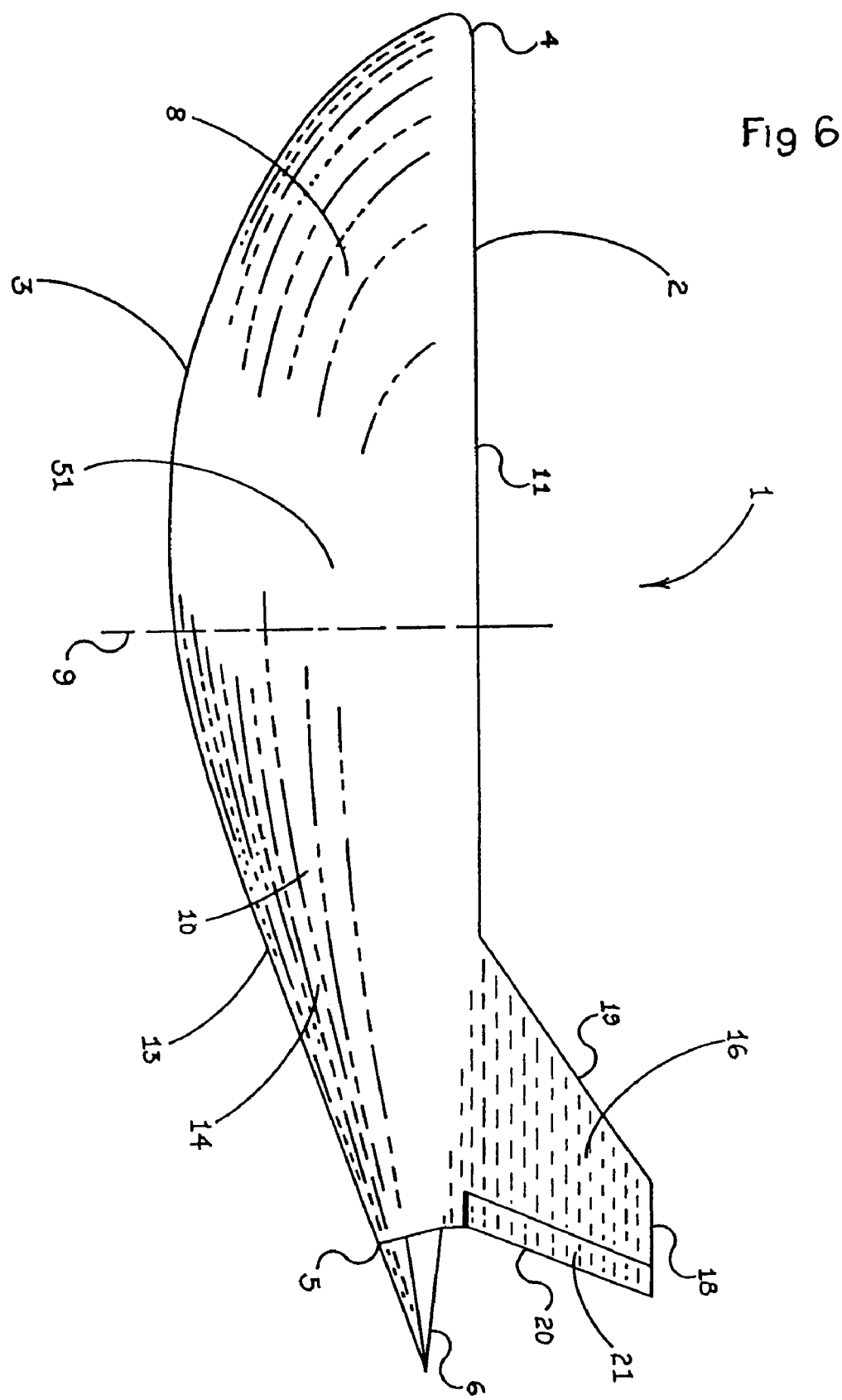
FIG. 6 is a side view of a preferred embodiment of the invention.
Figure 7:
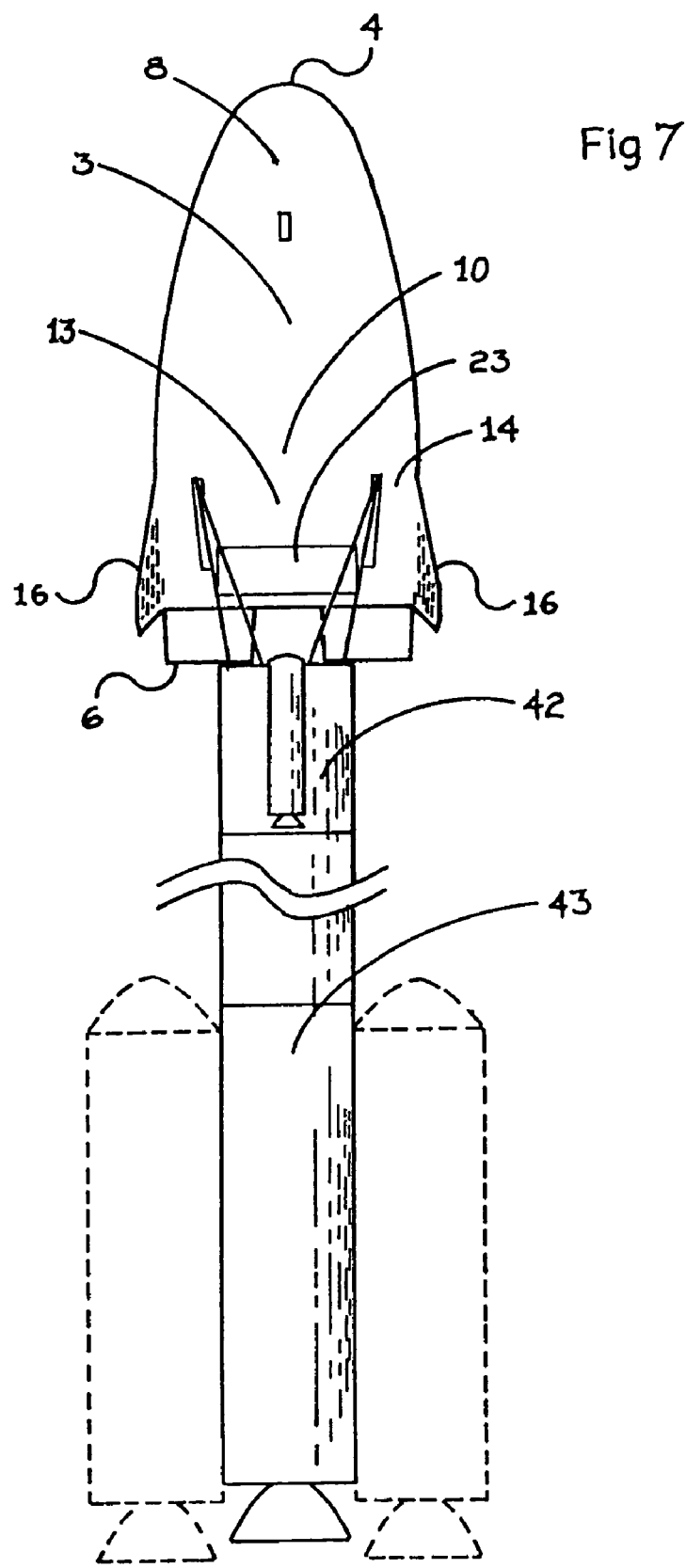
FIG. 7 is a bottom view of a preferred embodiment of the invention mounted to a launch vehicle.
Figure 9:
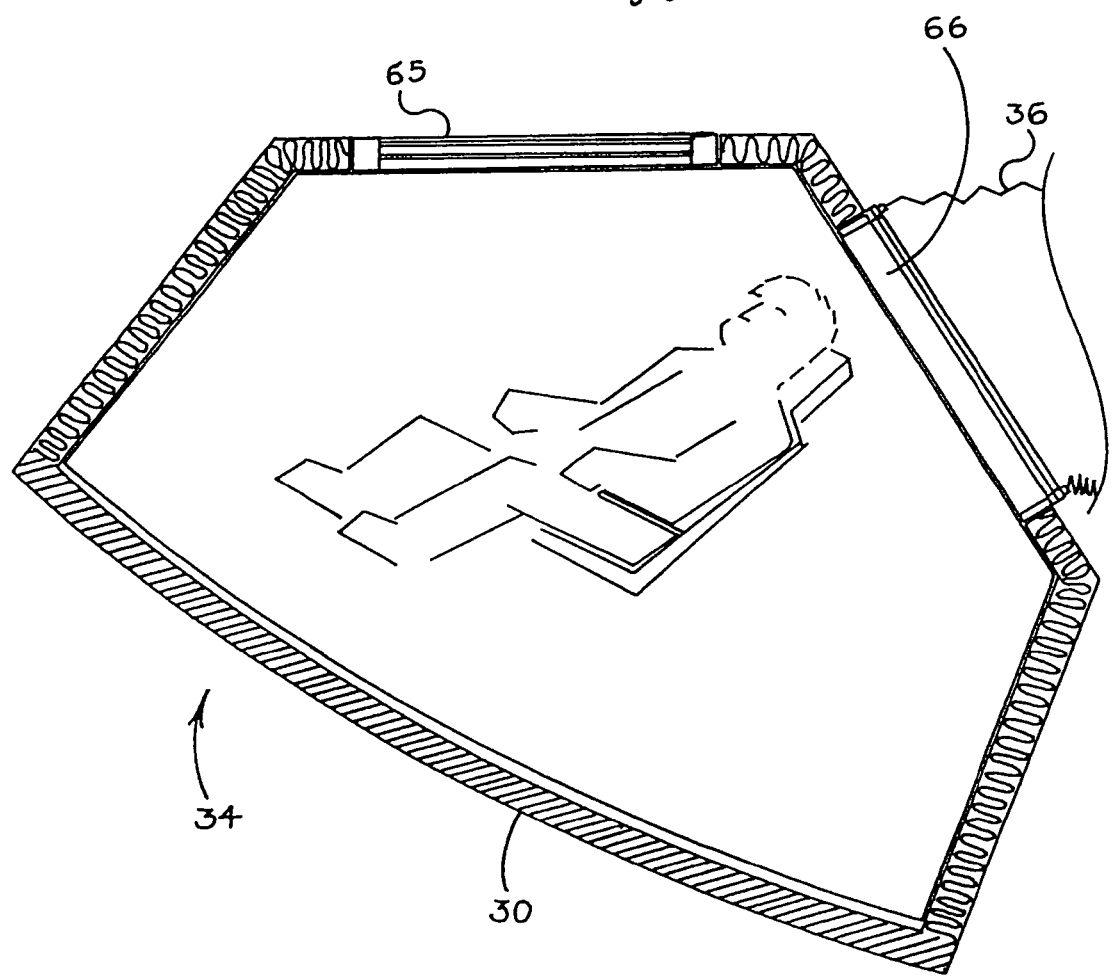
FIG. 9 is a side cutaway view of a preferred embodiment of a control module containing a pilot.
Figure 10:
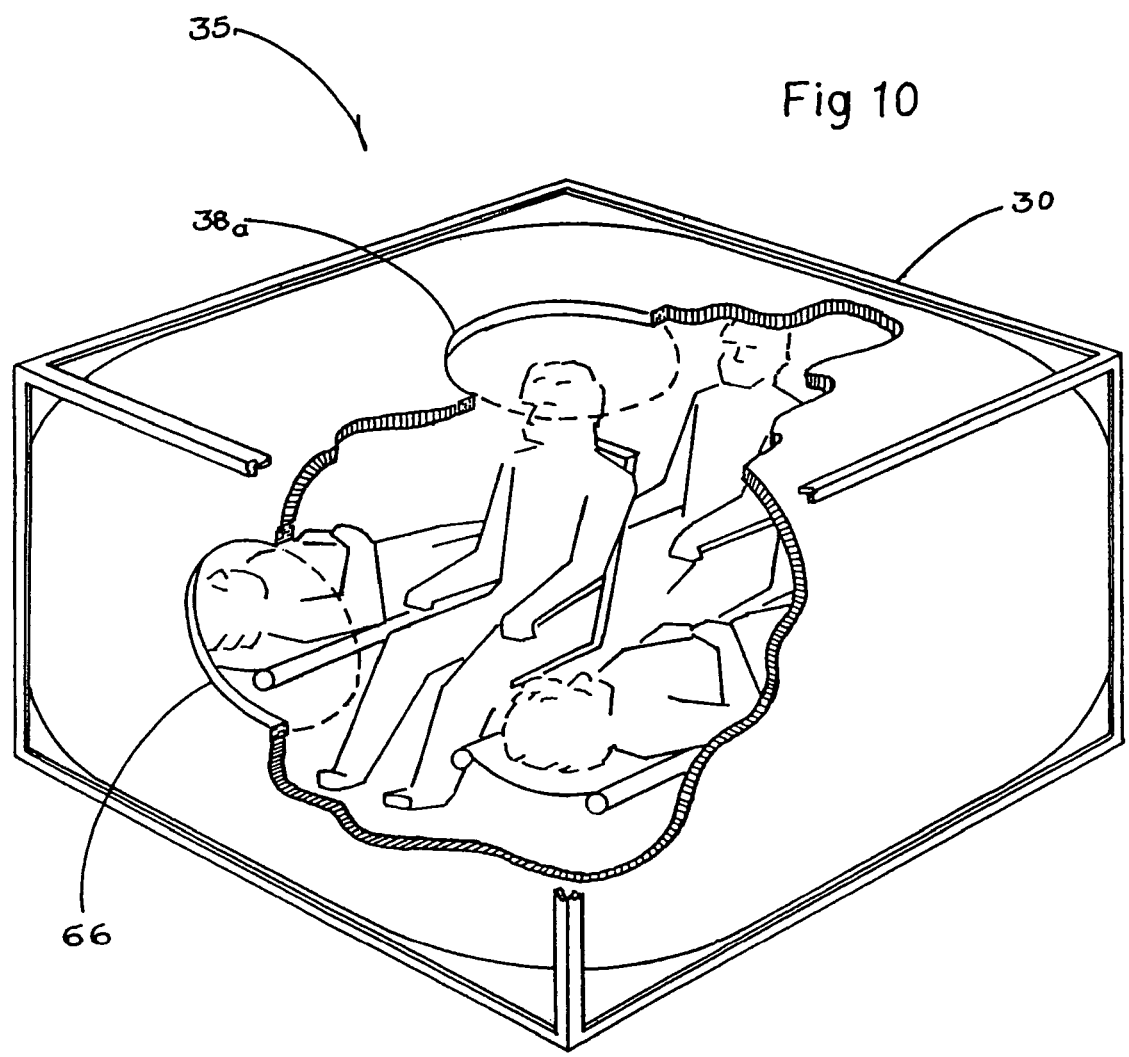
FIG. 10 is a perspective partial cutaway view of a preferred embodiment of a pressurized habitation module, configured for use as an emergency medical evacuation module.
Figure 11:
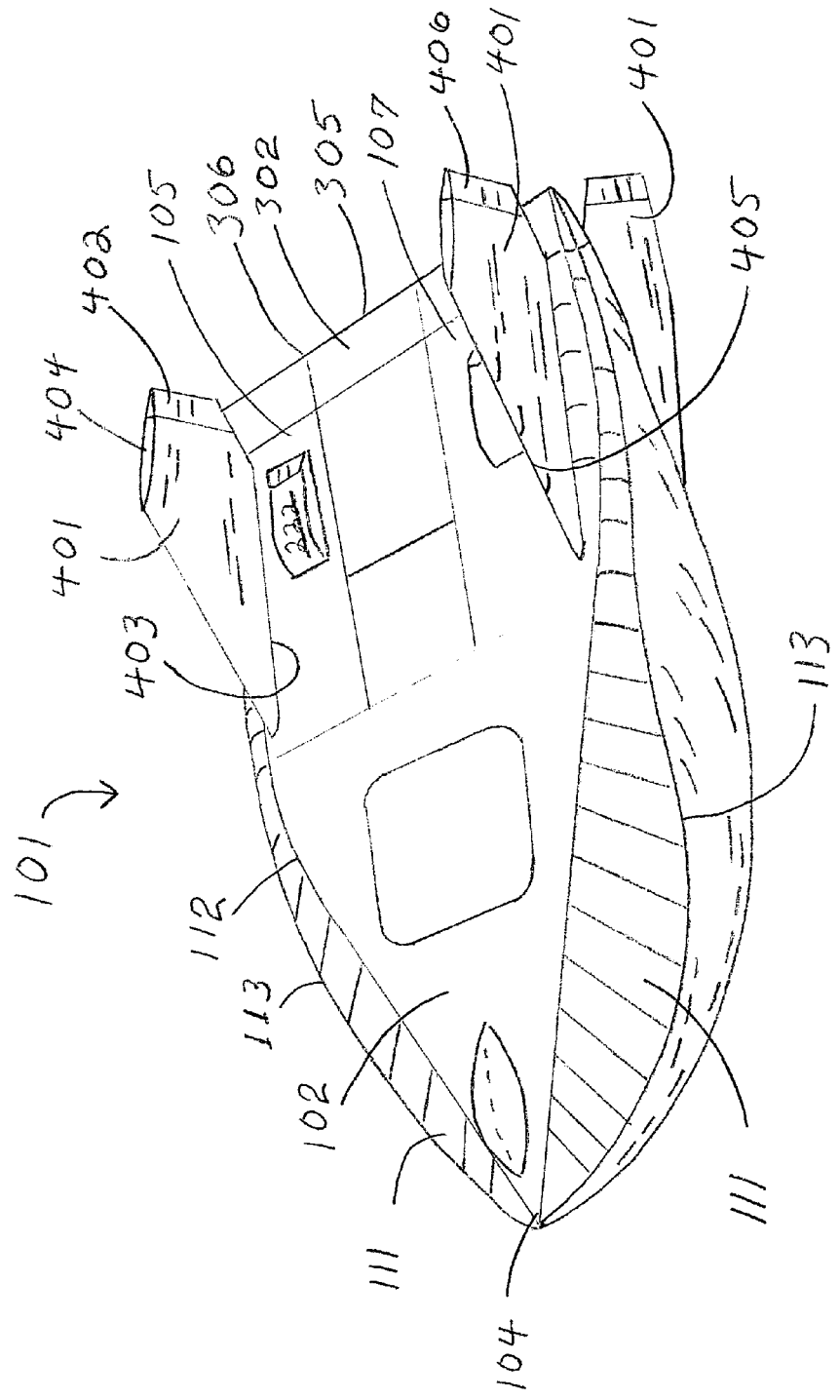
FIG. 11 is a perspective view of a preferred embodiment of the invention having chines.
Figure 12:
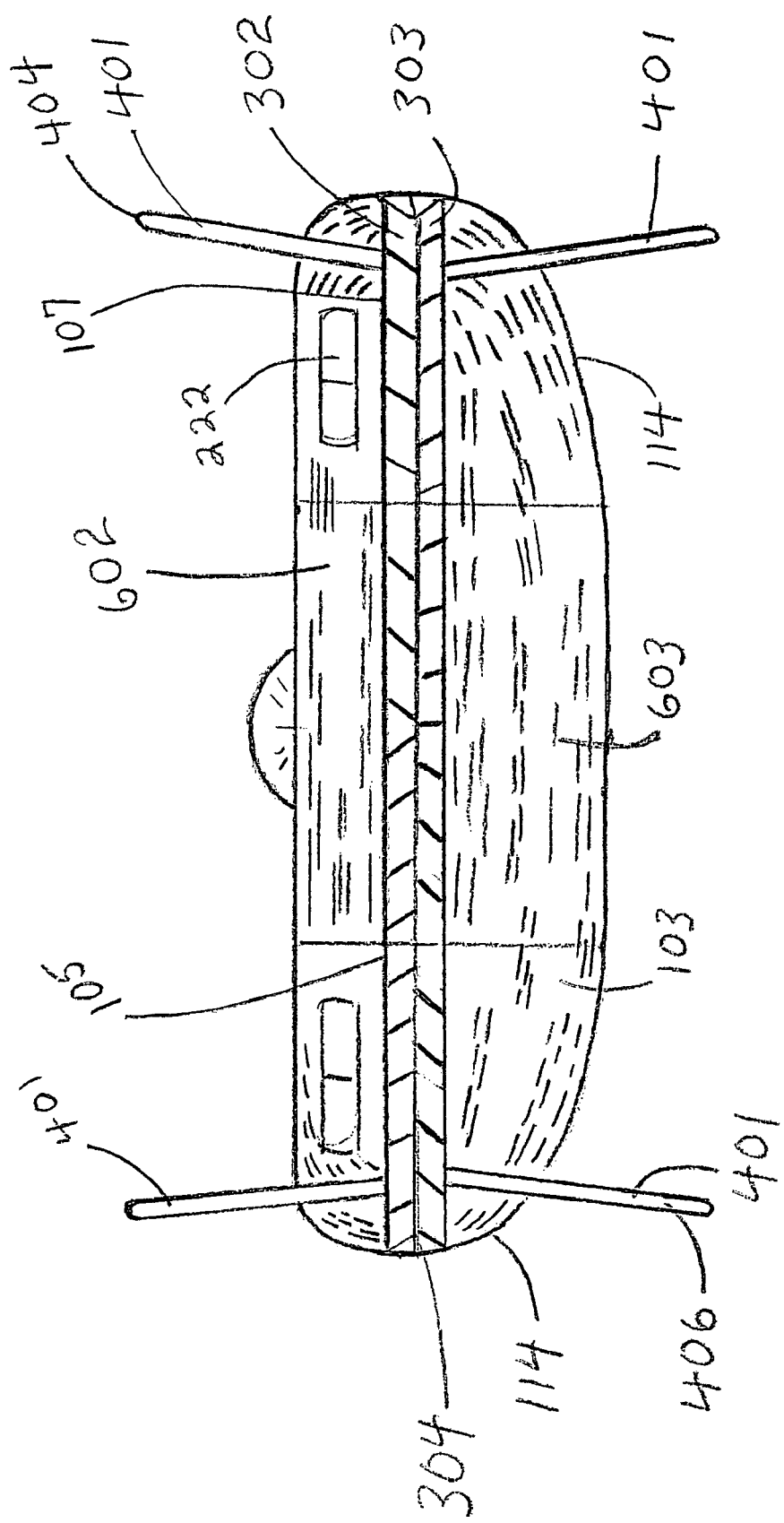
FIG. 12A is a rear end view of a preferred embodiment of the invention illustrating the cargo door in the closed position.
FIG. 12B is a rear end view of a preferred embodiment of the invention illustrating the cargo door in the open position.
FIG. 12C is a rear end view of a preferred embodiment of the invention illustrating the cargo door in the open position and the cargo port in the open position.
Figure 12:
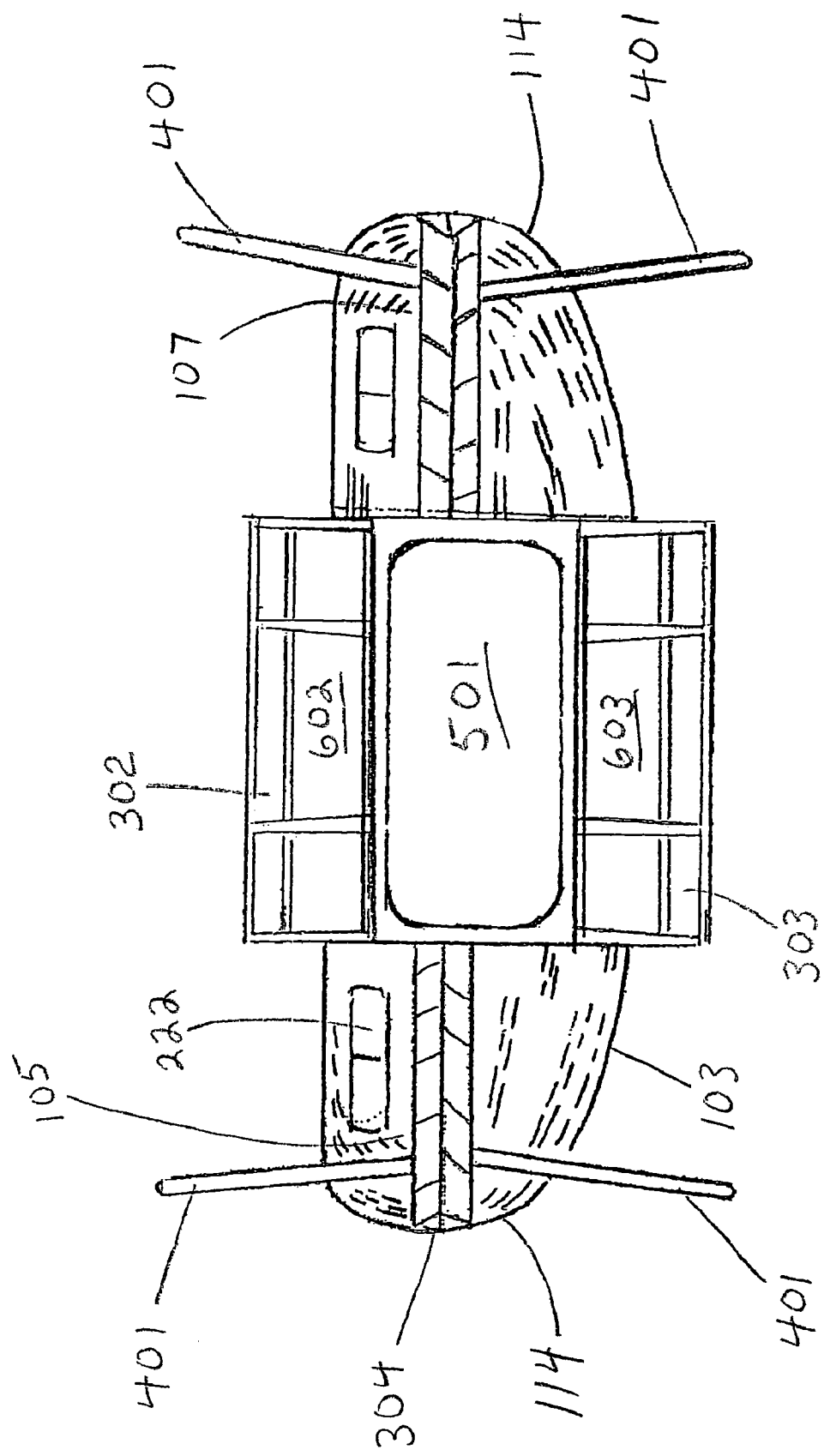
Figure 12:
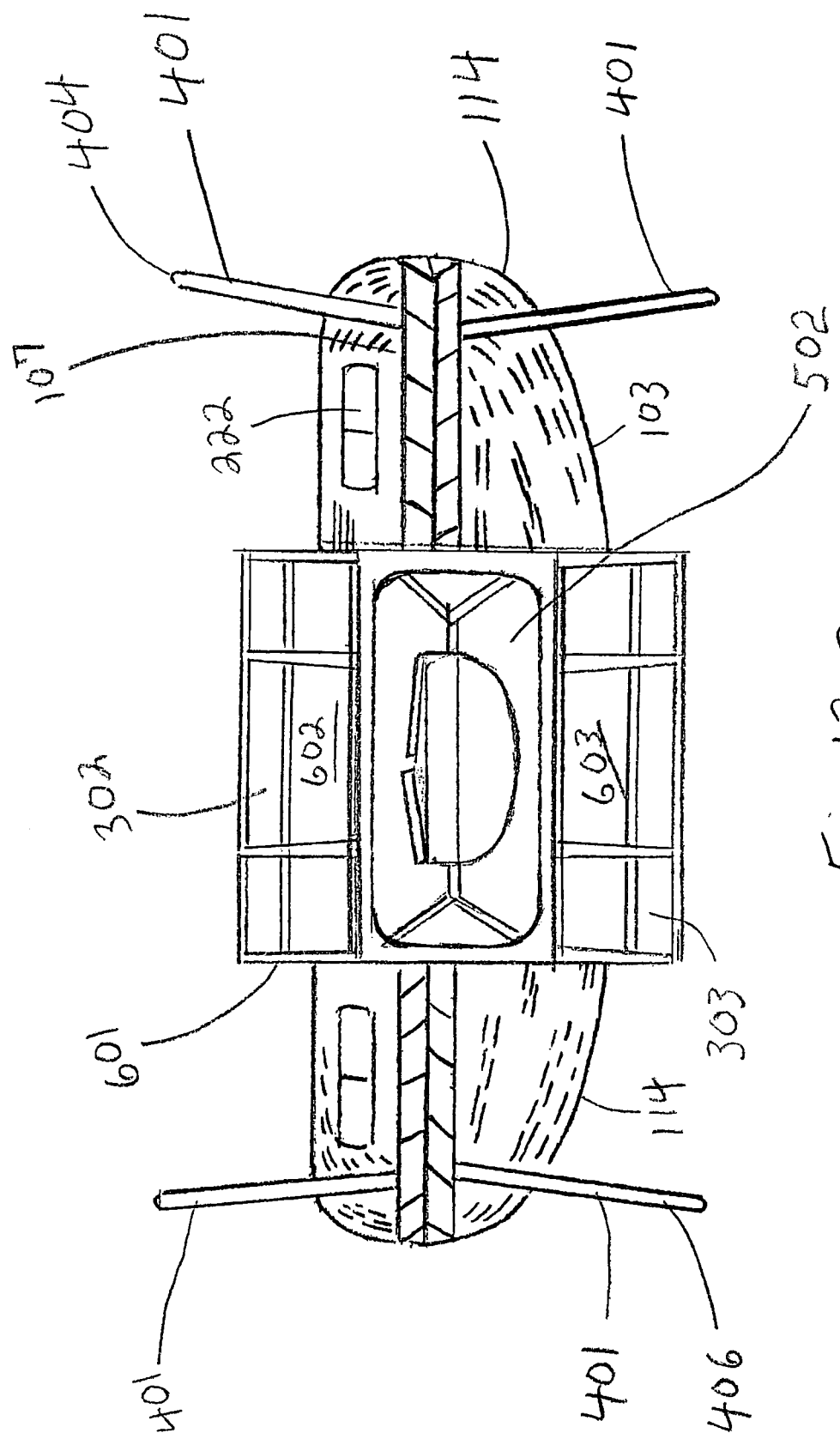
Figure 13:
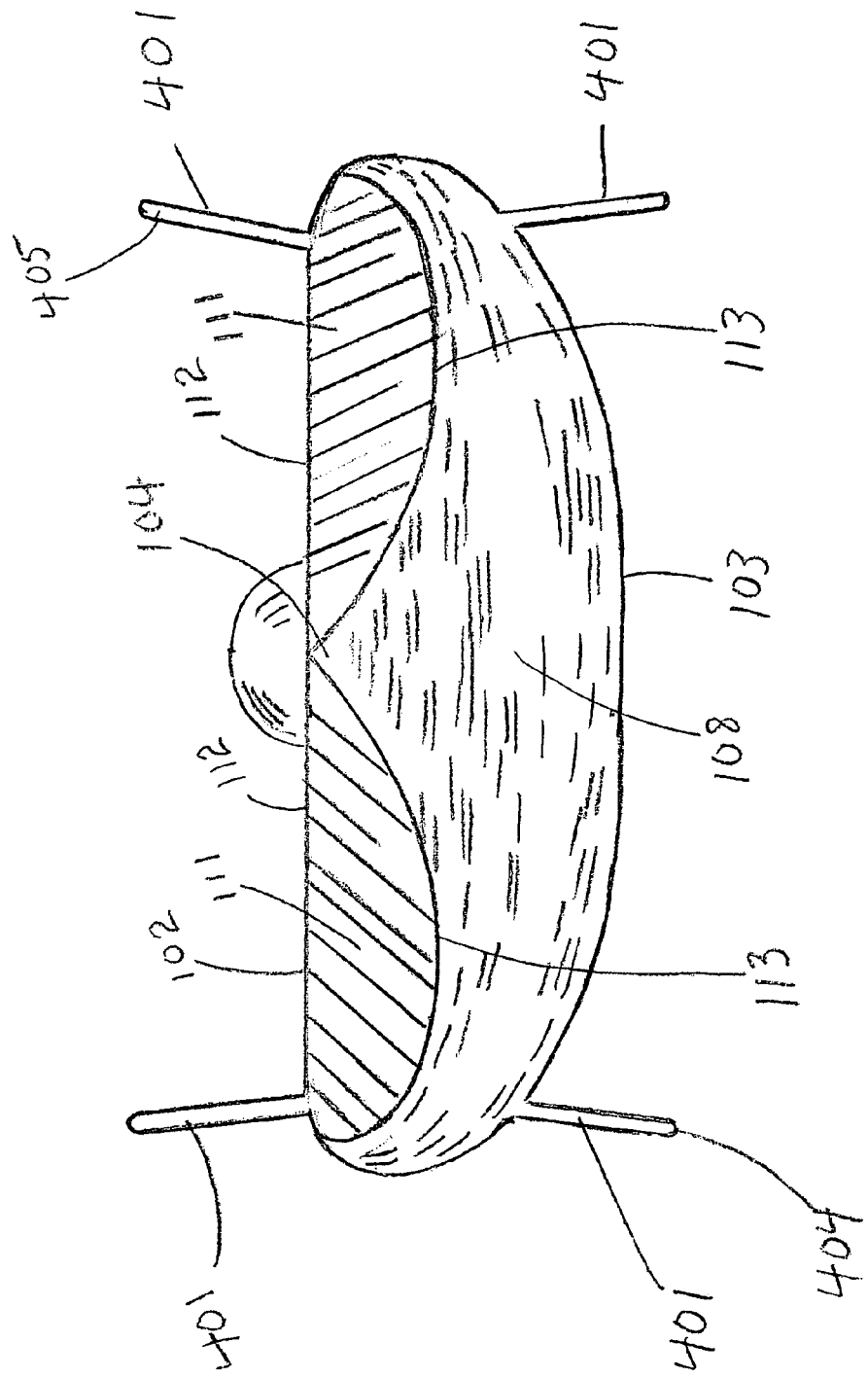
FIG. 13 is a front end view of a preferred embodiment of the invention having chines.
Figure 14:
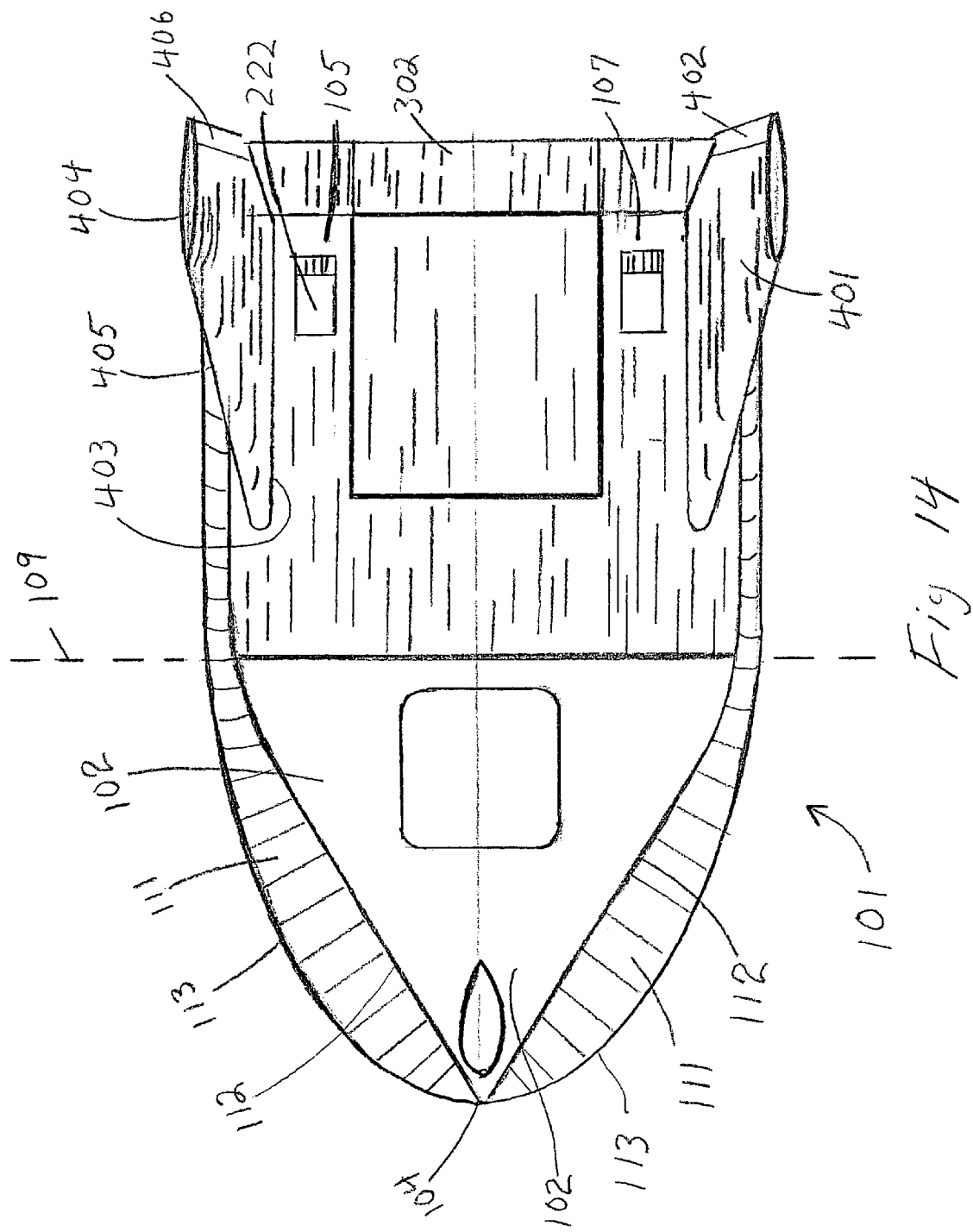
FIG. 14 is a top plan view of a preferred embodiment of the invention having chines.
Figure 15:
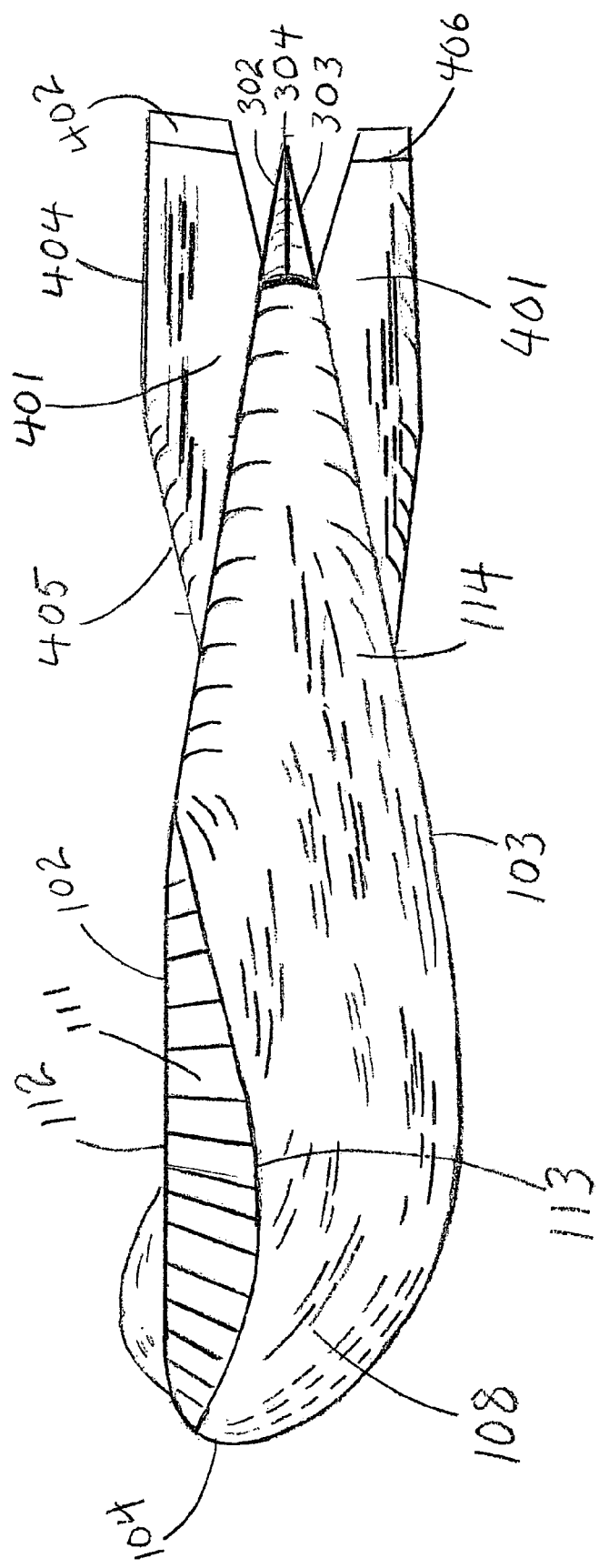
FIG. 15 is a side view of a preferred embodiment of the invention having chines.
Figure 16:
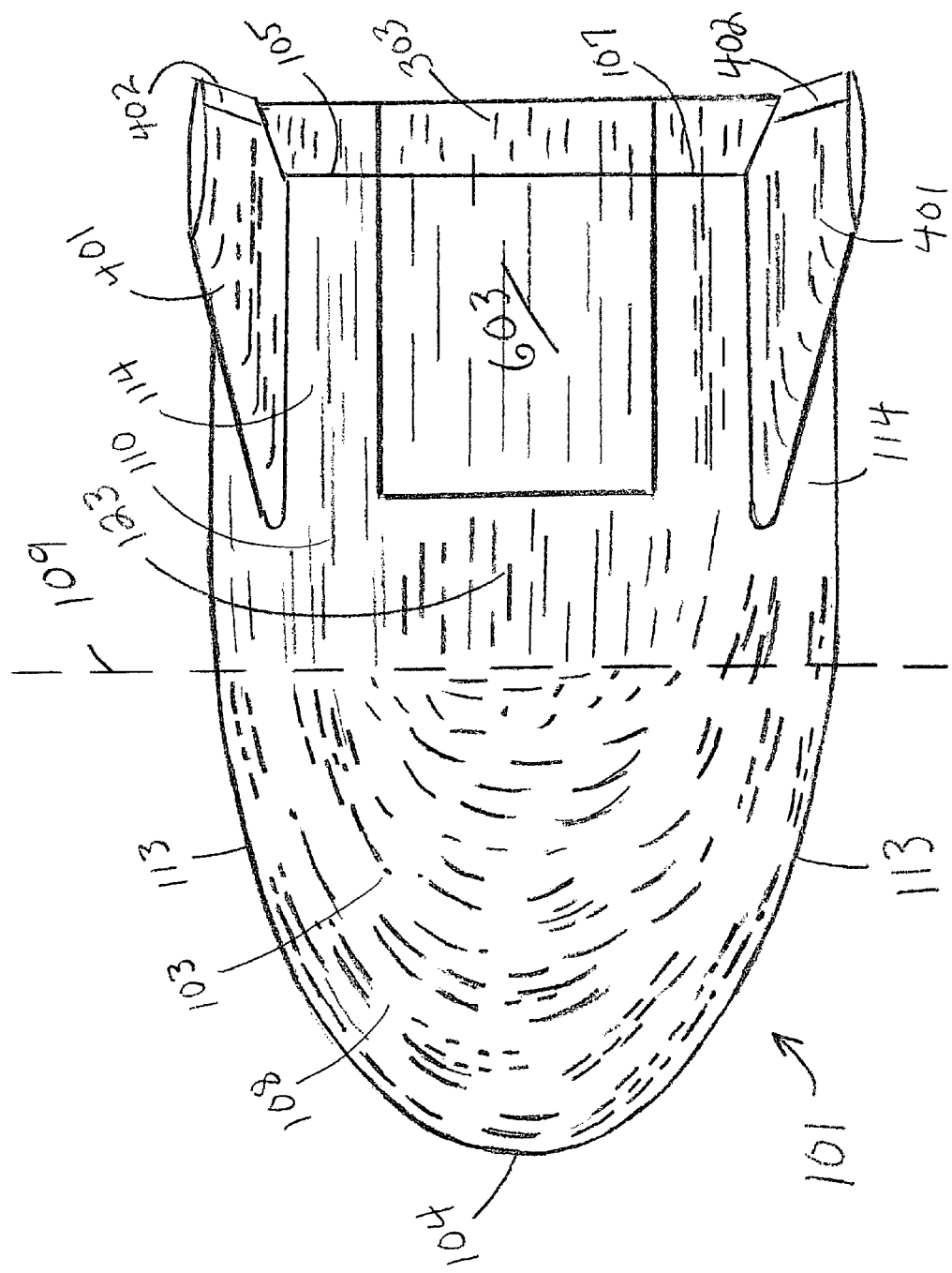
FIG. 16 is a bottom plan view of a preferred embodiment of the invention having chines.
Figure 17:
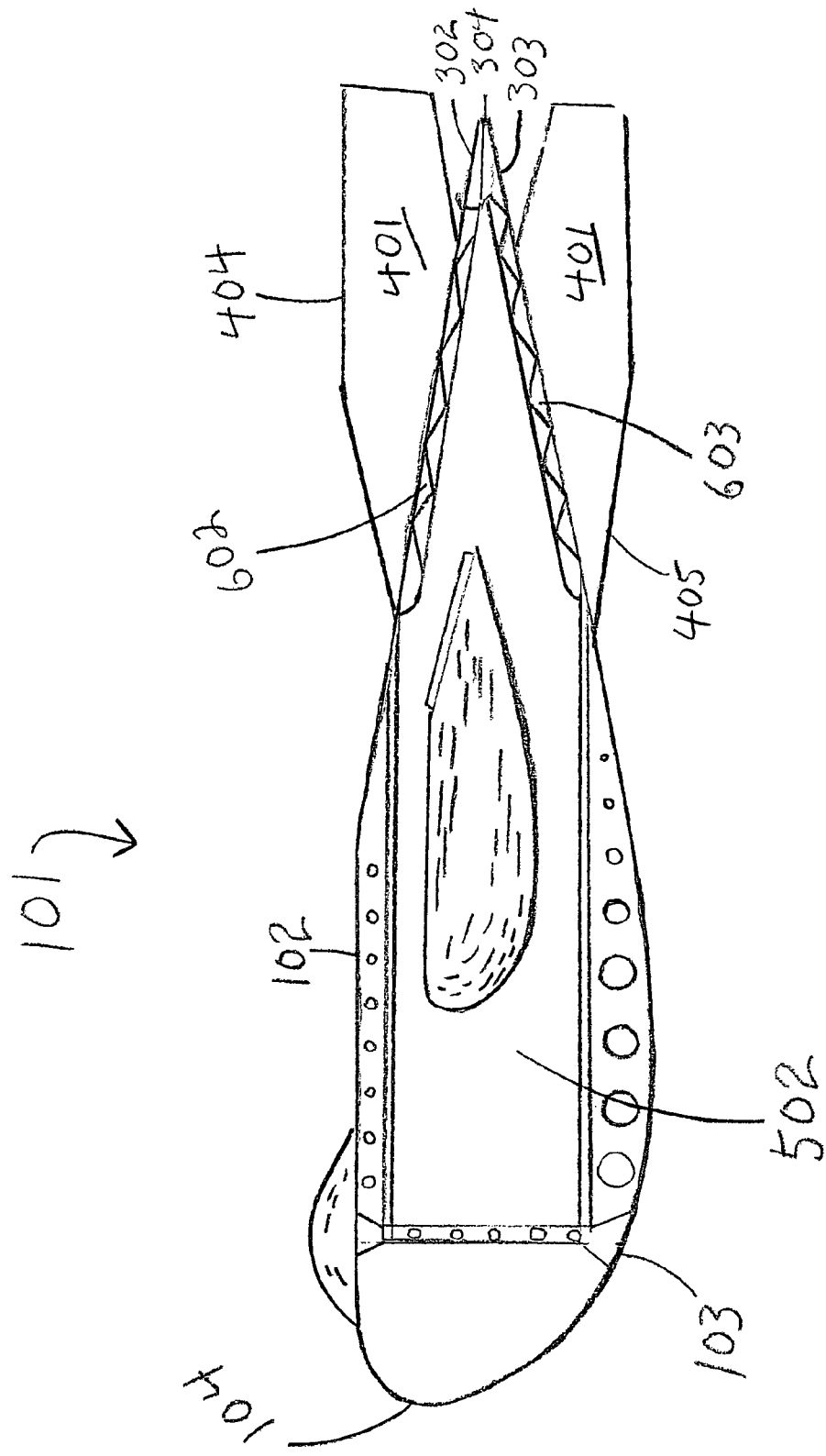
FIG. 17A is a side cut-away view of a preferred embodiment of the invention illustrating a second craft within the parent craft.
FIG. 17B is a side cut-away view of a preferred embodiment of the invention illustrating a second craft exiting the parent craft.
FIG. 17C is a side cut-away view of a preferred embodiment of the invention illustrating a second craft fully separated from the parent craft.
Figure 17B:
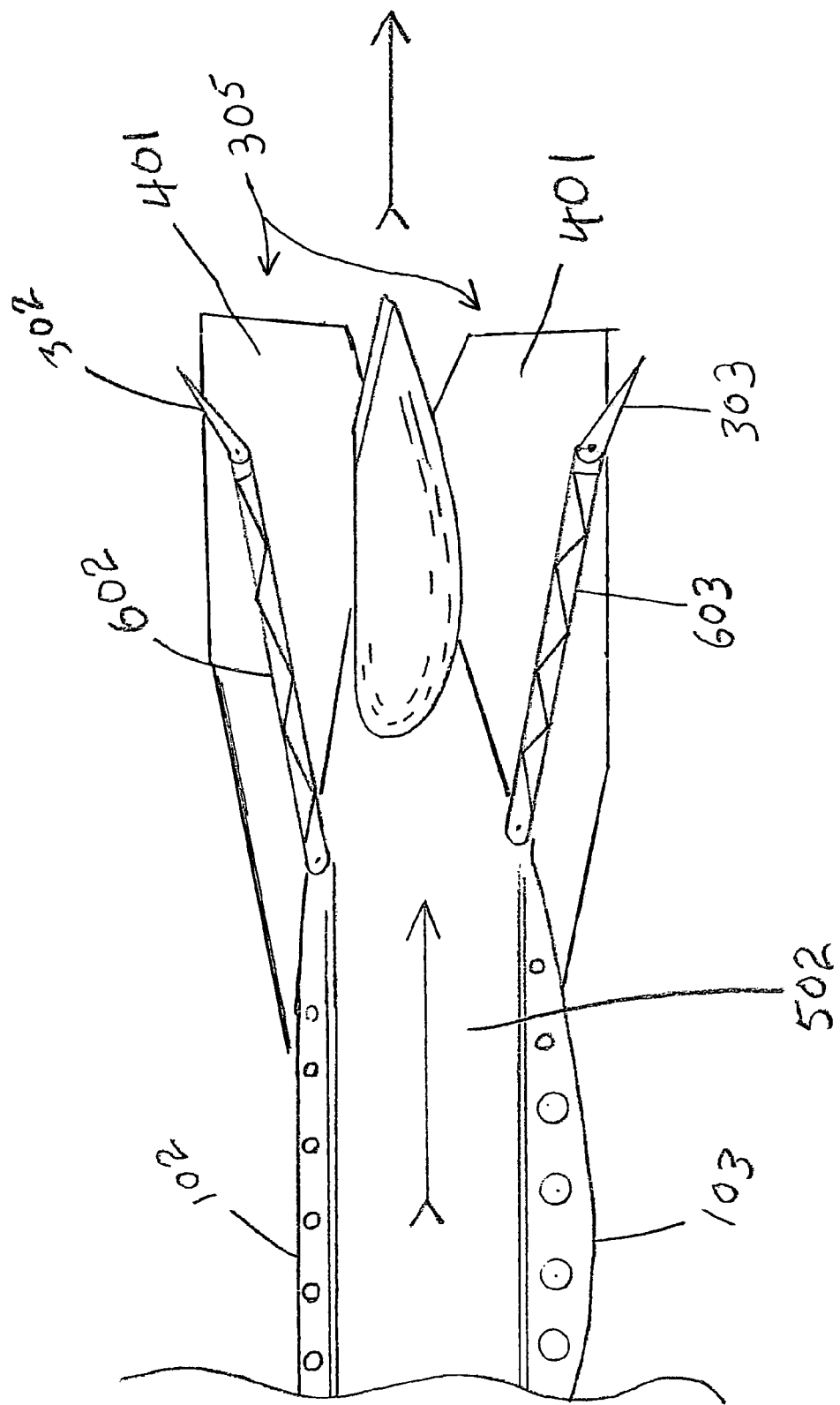
Figure 18:
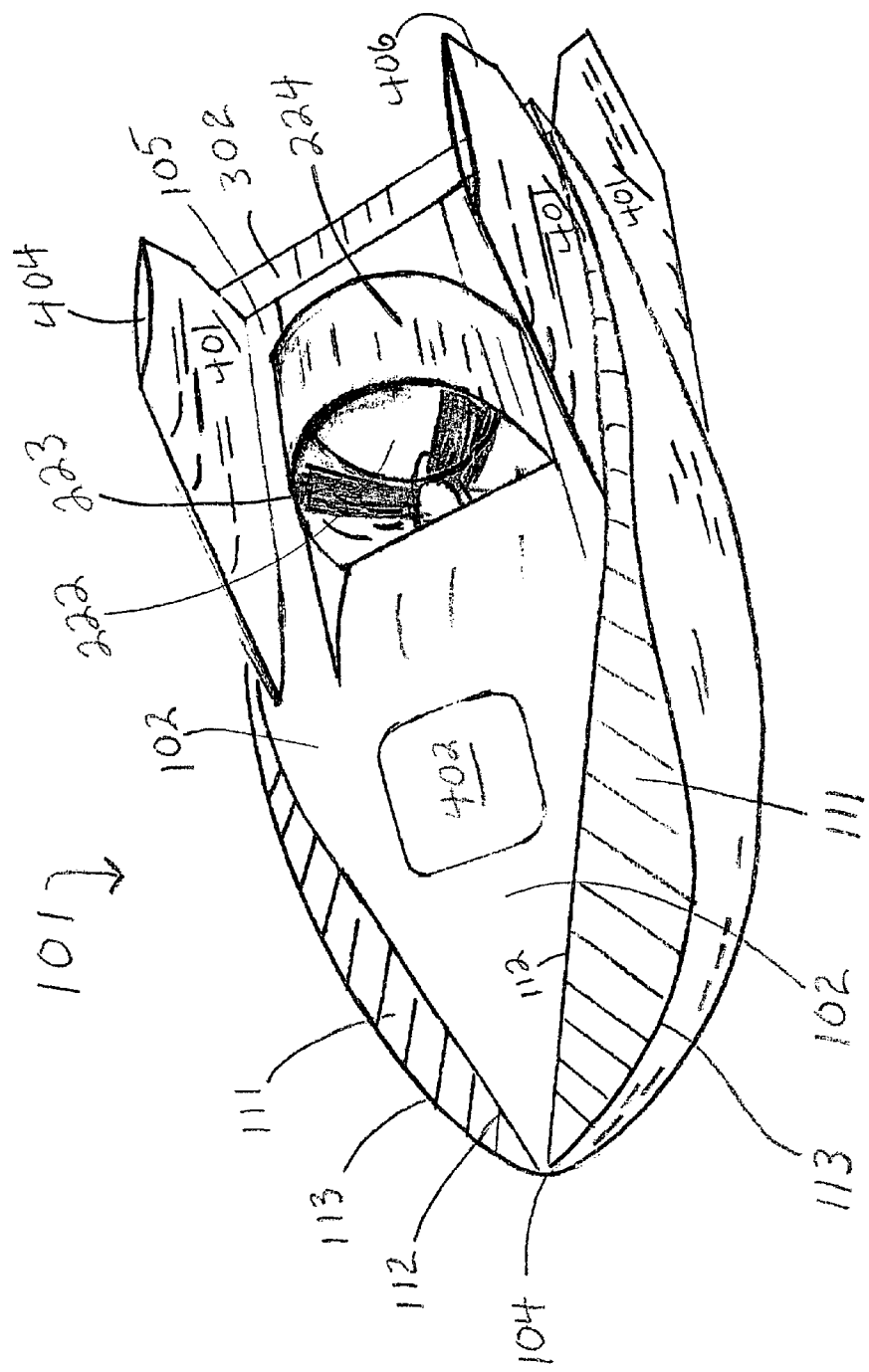
FIG. 18 is a perspective view of a preferred unmanned embodiment of the invention having chines.
Figure 19:
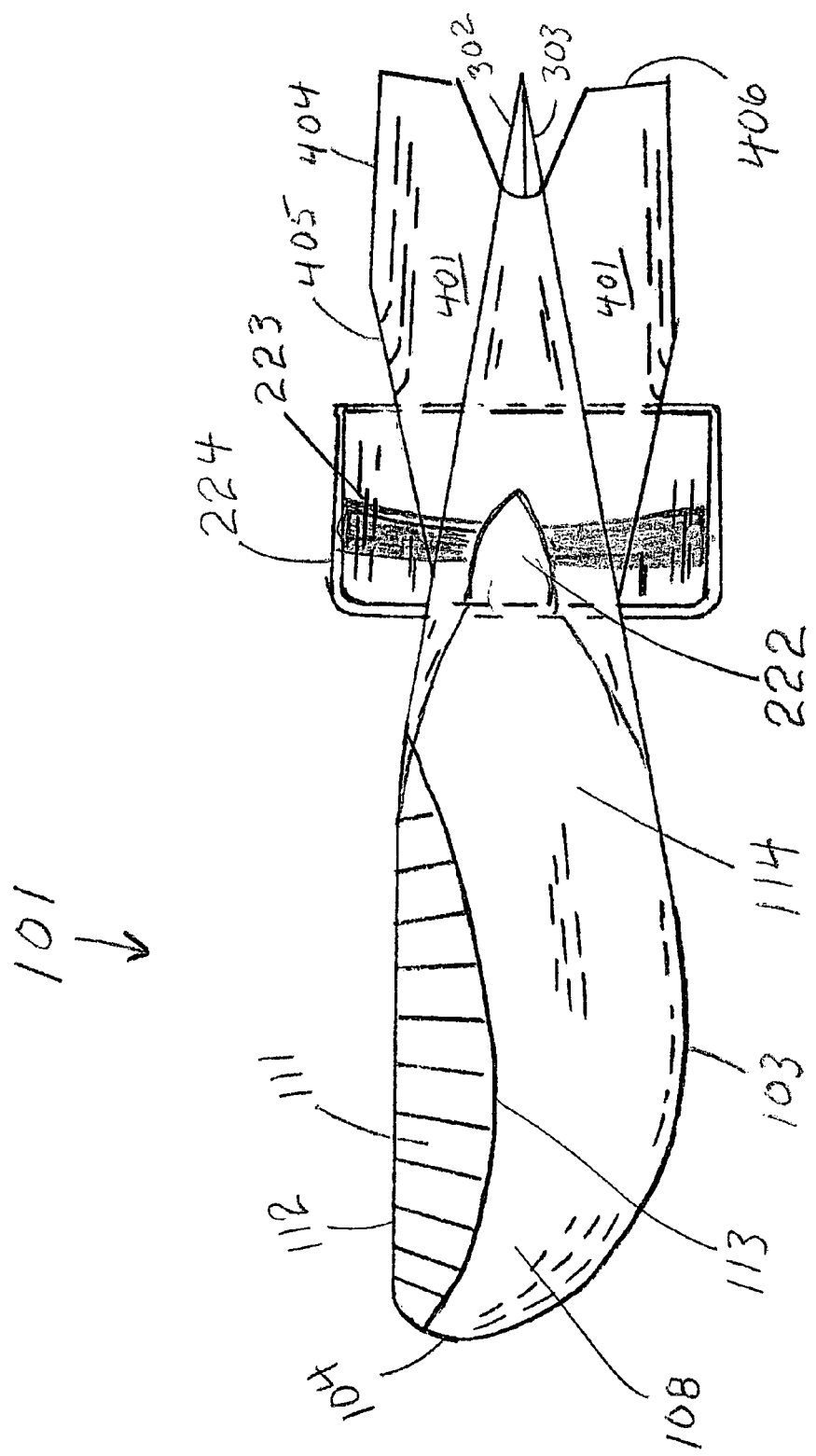
FIG. 19 is a side view of a preferred unmanned embodiment of the invention having chines.
Figure 30:
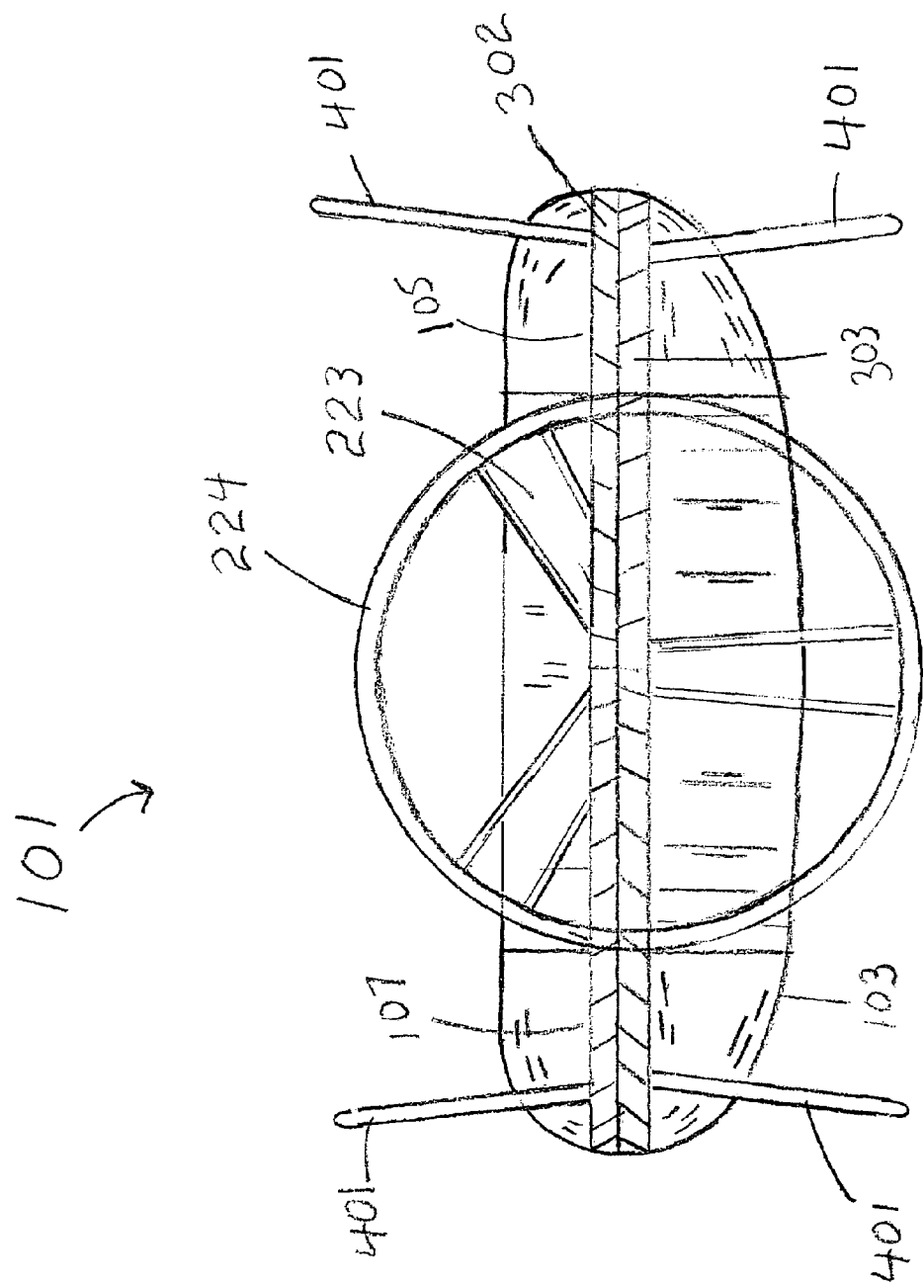

The invention comprises a lifting body aircraft 1 having an upper surface 2 and a lower surface 3. Upper surface 2 extends from the nose 4 to the tail 5 of craft 1. The length of craft 1 is that dimension extending from nose 4 to tail 5, excluding any elevons 6 (discussed below) which may be provided at the tail end or aft end 7 of craft 1.

Lower surface 3 has a first half 8 extending from nose 4 to about the longitudinal center line 9 of craft 1. The longitudinal center line 9 of craft 1 is determined by a plane severing craft 1 perpendicular to the length of craft 1 at the half way point between nose 4 and tail 5. Lower surface 3 also has a second half 10 extending from about longitudinal center line 9 to tail 5.

Upper surface 2 has a pair of edges 11 that extend from nose 4 to tail 5 such that nose 4, edges 11, and tail 5 demark upper surface 2. Edges 11 also demark two boundaries between upper surface 2 and lower surface 3. Edges 11 preferably run from nose 4 to tail 5 in a smooth continuous curve, widening continuously from nose 4 to a pair of points 12 each about one fourth of the way from tail 5 (or three fourths of the way from nose 4). The width of craft 1 is the longest dimension across upper surface 2 perpendicular to the length of craft 1. In one preferred embodiment the width is that distance between points 12. In another preferred embodiment, edges 12 continue on to tail 5 after points 12 at a distance from one another equal to that at points 12. In another preferred embodiment, edges 11 narrow or taper slightly between points 12 and tail 5. In still another embodiment, edges 11 continue to diverge until reaching tail 5 such that the width of craft 1 would be determined by measuring upper surface 2 across tail 5.

First half 8 of lower surface 3 is preferably doubly convex, meaning that it is convex in the dimension between nose 4 and longitudinal center line 9 as well as between edges 11. This will provide craft 1 with an enlarged front end, which will maximize the displacement of air over lower surface 3, thereby increasing pressure below craft 1.

Second half 10 of lower surface 3 has a central section 13 and side sections 14. Central section 13 extends from about longitudinal center line 9 to tail 5. The width of central section 13 is preferably about eighty-five percent of the width of craft 1. Central section 13 is preferably substantially flat rather than curved and should preferably extend toward tail 5 at an angle of about nineteen degrees with respect to a horizontal dimension substantially parallel to upper surface 2.

Side sections 14 begin as approximately flat surfaces depending from edges 11 in a direction generally normal to upper surface 2. At a point approximately one half the present depth of craft 1 at that longitudinal location, side sections 14 extend into a smooth convex curve to meet the outboard edges of central section 13.

Upper surface 2 is preferably as flat as practical from nose 4 to tail 5, preferably with a curvature of about three to five degrees or less. In one preferred embodiment, upper surface 2 begins to taper slightly, preferably at an angle of about 7.5 degrees to the horizontal, toward lower surface 3 at a point about one fourth of the length of craft 1 before tail 5 (or three fourths of the length of craft 1 after nose 4).

By configuring craft 1 with a doubly convex lower surface 3 fore of the longitudinal center line 9 and a flat tapering lower surface 3 aft of the longitudinal center line 9 and a flat or substantially flat upper surface 2, the internal volume of craft 1 will be greater forward of the longitudinal center line 9 than aft. Although the location of the center of gravity of craft 1 will depend upon how craft 1 is loaded, by configuring the internal volume of craft 1 as described, it will be possible to position the center of gravity of craft 1 forward of the longitudinal center line 9. Preferably, the center of gravity is located within about five percent of the length of craft 1 from the longitudinal center line 9 and most preferably at about five percent of the length of craft 1 from the longitudinal center line.

Providing a center of gravity for craft 1 that is forward of the longitudinal center line 9 will enhance its flight stability. In combination with the wider remainder of craft 1, it will function like a shuttlecock, with the center of gravity forward and with a less massive but wider portion behind. Lifting body craft have a natural tendency to pitch up from the mass of air being pushed by the nose of the craft. This pitch up effect is reduced and the craft will naturally travel with its longer (as measured from the center of gravity) lighter tail following the heavier nose. However, care must be taken to ensure that the center of gravity is not too far forward. If the center of gravity is too far forward, craft 1 may begin to behave more like a thrown hammer than a shuttlecock, with tail 5 naturally tending to rotate around nose 4.

Positioning the center of gravity fore of longitudinal center line 9 by about five percent of the length of craft 1 is believed to be the most efficacious position in the preferred embodiment; however further or lesser advancement of the center of gravity fore of the longitudinal center line 9 may prove efficacious as the dimensions or overall mass of craft 1 are varied. The most ideal position for the center of gravity for any craft 1 built according to the teachings of this invention should, therefore, preferably be determined experimentally across the entire flight velocity and attitude regime designed for the application, most preferably by building a scale model and conducting computer analysis and wind tunnel testing.

Extending from tail 5 are one or preferably at least two elevons 6. Elevons 6 will serve at least two purposes. First, as noted above, upper surface 2 and lower surface 3 are configured to taper smoothly to a point, thereby creating the aft portion of an airfoil 15. As craft 1 moves through the air, it displaces air. As the air masses separated by craft 1 come back together, turbulence is created, with several adverse effects. As air spills from below craft 1, it will generate turbulence above craft 1, thereby reducing lift. Second, turbulence around the control surfaces of craft 1 will make craft 1 more difficult to control. Finally, turbulence will create a contrail behind craft 1, making it more visible, which may confound the purposes of the pilot if stealth is desired. The aft portion of airfoil 15 brings the air flowing over upper surface 2 and lower surface 3 back into substantially parallel and adjacent paths, restoring substantially laminar flow and reducing turbulence and drag. Elevons 6 serve to effectively extend the aft portion of airfoil 15 beyond tail 5 of craft 1.

Elevons 6 also provide pitch control for craft 1. By raising elevons 6, nose 4 may be raised and by lowering elevons 6, nose 4 may be lowered. Elevons 6 also provide roll control for craft 1. By raising only one starboard elevon 6, for example, craft 1 will roll clockwise, as viewed from the pilot's position looking forward.

In one preferred embodiment, elevons 6 may be split into upper and lower sections. These sections may be operated together or they may be deployed in opposite directions (up and down). When deployed in opposite directions, the sections of elevons 6 will serve to brake the speed of craft 1 and also to provide greater surface area to its control surfaces. This latter feature may be particularly useful when craft 1 is used as a reentry vehicle.

In one preferred embodiment, a ventral body flap 23 is provided in central section 13 of lower surface 3, preferably proximate to tail 5. Ventral body flap 23 may be used to provide additional pitch control for craft 1, primarily when craft 1 is in relatively high pitch attitudes (above about thirty degrees).

As mentioned above, one of the ways turbulence can arise in the operation of craft 1 is from the collision of air masses flowing over upper surface 2 and lower surface 3 when those masses meet. Air masses may collide at edges 11 as well as tail 5. The resulting turbulence may be particularly disruptive to the flight stability of craft 1. To counter this potential turbulence, a pair of dorsal vertical stabilizers 16 are provided. Dorsal vertical stabilizers 16 have a base 17 an upper end 18 opposite base 17, a leading edge 19, and a trailing edge 20. In the preferred embodiment, bases 17 of each stabilizer 16 are positioned along edge 11 beginning at tail 5 and extending toward nose 4 a distance equal to about twenty-five percent of the length of craft 1. Dorsal vertical stabilizers 16 are preferably angled outward from base 17 to upper end 18 at about twenty degrees with respect to vertical. In the preferred embodiment, upper end 18 is about one third the length of base 17. Leading edge 19 is preferably angled at about sixty to seventy degrees and most preferably at about sixty-eight degrees to the horizontal and trailing edge is preferably angled at about sixty-five to seventy-five degrees and most preferably at about seventy degrees to the horizontal. In the preferred embodiment, dorsal vertical stabilizers 16 preferably extend about 4.2 feet above upper surface 2 of craft 1.

Dorsal vertical stabilizers 16 will serve as winglets, meaning that they will prevent the air flow passing over lower surface 3 from developing eddies and cavitation effects at the aft end of craft 1. Air moving over lower surface 3 and upper surface 2 will be separated by dorsal vertical stabilizers 16, at least in the vicinity of tail 5. This will reduce turbulence and conversely increase lift.

Dorsal vertical stabilizers 16 will also serve to provide craft 1 with additional yaw stability. Dorsal vertical stabilizers 16 provide a substantial surface area aft of the center of gravity. For craft 1 to yaw or pivot about a vertical axis through its center of gravity, dorsal vertical stabilizers 16 will have to move against the air flow. The resistance to this movement helps keep the aft end of craft 1 in line behind its center of gravity in much the same way as the vanes of a shuttlecock keep it in line in flight.

Dorsal vertical stabilizers 16 will also help prevent craft 1 from spinning about its horizontal lengthwise axis, like vanes on a dart. To do so, the wide flat surfaces of dorsal vertical stabilizer 16 would have to move against the air flow. The resistance to this movement helps to keep craft 1 stable in a roll.

Trailing edges 20 of dorsal vertical stabilizers 16 may also be provided with rudders 21. Rudders 21 will provide a roll impetus and yaw impetus to craft 1. Although both impetuses are provided, the only appreciable effect on craft 1 will be to roll.

The yaw impetus is relatively apparent. As rudder 21 is moved to one side, air will impact extended rudder 21, applying force to craft 1 at an angle roughly perpendicular to dorsal vertical stabilizers 16, thereby generating a yaw impetus. However, as soon as this begins, the airflow over craft 1 will strongly resist the yaw impetus. Any yaw of craft 1 will present a leading side of craft 1 and of dorsal vertical stabilizers 16 to the airflow. The airflow against the leading side will generate pressure against this leading side. Similarly, a trailing side of craft 1 and of dorsal vertical stabilizers 16 will also be created. The trailing side will be protected from the airflow, and a decrease in pressure will result. The increase in pressure on the leading side of craft 1 and dorsal vertical stabilizers 16 combined with the reduction in pressure on the trailing side will result in craft 1 returning to a flight having zero degrees of yaw. Any deviation from a zero degree yaw attitude will cause an immediate and proportional force resisting the yaw impetus to be exerted on craft 1.

When rudders 21 are deflected to one side, they also generate a roll impetus. Airflow over dorsal vertical stabilizers 16 is more laminar and, therefore, more concentrated at the upper ends 18 of stabilizers 16. Because the airflow is more concentrated at the upper ends 18 of vertical stabilizers 16, the force applied to rudders 21 by the airflow when rudders 21 are deflected is greater near upper ends 18 than near base 17. When the forces applied across the length of a deflected rudder 21 are resolved into a vector, the vector will, therefore, be located near upper end 18. This force vector will act over an effective lever arm extending from the location of the resolved force vector to the center of gravity of craft 1. As described above, this force vector will be roughly perpendicular to vertical stabilizers 16. Thus, the force acting across the effective lever arm will generate a roll moment causing craft 1 to roll.

Unlike the yaw impetus, the roll impetus is not resisted by proportional restoring forces, although there is a righting moment that arises in a roll, discussed below. In a conventional winged aircraft, the roll moment is opposed by large lift forces effectively located at the center of lift of the wings. These lift forces act across long moment arm distances extending from the center of lift of each wing to the center of gravity of the craft. To cause winged craft to roll, these forces must be overcome. No such forces exist in lift bodies. Accordingly, craft 1 can be caused to roll with the roll impetus from rudders 21.

In view of the high resistance of craft 1 to yawing and the relative lack of resistance of craft 1 to rolling, when rudders 21 are deflected, craft 1 will roll rather than yaw. This results in turns that are banked angles rather than flat turns, providing an aircraft that is highly maneuverable and responsive.

When dorsal vertical stabilizers are angled outward, rudders 21 may also be used to control pitch. Moving the starboard rudder to port and the port rudder to starboard will cause nose 4 to pitch up. Moving the starboard rubber to starboard and the port rudder to port will also cause nose 4 to pitch down.

The effect of rudders 21 on pitch are the result of V-tail mixing. Because dorsal vertical stabilizers 16 are positioned at an angle, rudders 21 function both as rudders and elevators. If vertical stabilizers 16 were positioned at a forty-five degree angle, displacement of rudders 21 would provide equal roll impetus (rudder function) and pitch impetus (elevator function). In the most preferred embodiment, dorsal vertical stabilizers 16 are angled outward about twenty degrees from the vertical. Thus, rudders 21 provide more impetus to roll and less to pitch. Nevertheless, if both rudders 21 are moved inboard (starboard rudder to port and port rudder to starboard) or if both rudders 21 are moved outboard (starboard rudder to starboard and port rudder to port) the roll impetus from each rudder 21 will neutralize the other. Only the pitch impetus will have net effect on the attitude of craft 1. This configuration provides redundancy in the controls of craft 1. Pitch, roll, and yaw impetus may be provided by both rudders 21 and elevons 6.

In a preferred embodiment, rudders 21 are each divided into a left and right section, allowing each rudder 21 to be opened simultaneously in both directions. When craft 1 is used as a reentry vehicle, this feature is expected to be particularly useful. During the initial stages of reentry, craft 1 will travel through the very thin portions of the upper atmosphere. There will be little air to act on craft 1. The ability of the control surfaces of craft 1 to "bite" the thin air and keep craft 1 properly oriented may be increased by increasing the surface area of those control surface. Flaring each section of rudders 21 will maximize their surface area. When craft 1 is in lower levels of the atmosphere, extending the sections of rudders 21 in opposite directions can serve to brake the speed of craft 1.

In one preferred embodiment, dorsal vertical stabilizers 16 may be hinged to lie flat against upper surface 2. The inventors contemplate folding stabilizers 16 down during launch and deploying stabilizers 16 prior to reentry.

In addition to the features mentioned above, several other features help keep craft 1 stable in flight. Any potential rotation of craft 1 about a horizontal axis perpendicular to its length (i.e., pitch) is resisted by the outward flare of dorsal vertical stabilizers 16 and by the relative width of tail 5 compared to nose 4. The outward flare of dorsal vertical stabilizers 16 would require the surfaces of stabilizers 16 to move against the airflow were craft 1 to rotate in this manner. Similarly, the wide areas of the aft portion of upper surface 2 or the aft portion of lower surface 3 would have to move against the air flow for craft 1 to rotate in this manner.

Craft 1 also has a natural righting moment in a roll. The force exerted on craft 1 by lift may be represented by a vector (L) which is generally perpendicular to upper surface 2 of craft 1 and positioned at the approximate center of upper surface 2 and preferably aligned over the center of gravity of craft 1 in the Y axis (port-starboard dimension). The force of gravity acting on the mass of craft 1 may be represented by a vector (W) depending straight down from the center of gravity of craft 1. When craft 1 begins to roll, the vector representing lift (L) will still be generally perpendicular to upper surface 2 of craft 1, as shown in FIG. 8B. Significantly, however, although lift (L) is still positioned at the approximate center of upper surface 2, it is no longer positioned over the center of gravity of craft 1. The lift vector (L) may be resolved into its horizontal (Lx) and vertical (Ly) components. The vertical (Ly) component and weight (W) still oppose one another. However, they now do so across a distance equal to the horizontal displacement between Ly and W. These opposing forces acting across this distance will create a negative roll moment which will urge craft 1 to return to a horizontally neutral attitude. Thus craft 1 will naturally recover from a roll.

Craft 1 will also naturally recover from a stall. As craft 1 increases its angle of attack, lift will increase at first; however, as the angle of attack exceeds about forty degrees to horizontal, lift will begin to diminish and when the angle of attack of craft 1 exceeds about forty-five degrees to the horizontal, depending upon air speed, laminar air flow over the upper surface is completely disrupted and replaced by turbulent flow, resulting in the complete loss of lift. At this point, craft 1 will stall.

Aerodynamic control of most aircraft is lost in a stall because one airfoil surface stalls first, losing all lift and causing the craft to roll and spin. Control surfaces become ineffective, and significant pilot input is usually required for any chance of recovery. However, because the center of gravity of craft 1 is forward, craft 1 will pivot around a horizontal axis perpendicular to its length in a stall and fall with nose 4 forward. Dropping nose 4 will reestablish and/or reorient airflow over craft 1 and resume effective lift with or without pilot intervention. Thus, the natural inclination of craft 1 will be to provide proper corrective action in a stall. The inherent stability of craft 1 will be particularly important in unmanned and unmanned combat versions of craft 1 where control input response to extreme flight dynamics is often limited.

The depth of craft 1 is that distance defined by the longest line that can be extended from lower surface 3 to upper surface 2 and which is perpendicular to upper surface 2. The preferred embodiment of craft 1 has a length to width to depth ratio of about 4:4:2 to about 4:1:1 and most preferably about 4:2:1. This ratio will facilitate the forward center of gravity discussed above. The preferred embodiment of craft 1 will have a length of about thirty feet, width of about fifteen feet, and depth of about seven and a half feet, although larger or smaller craft may certainly be constructed, preferably following the above recited ratios.

Craft 1 may also be provided with ventral vertical stabilizers 24. Ventral vertical stabilizers 24 will depend from lower surface 3 of craft 1, proximate tail 5. Ventral stabilizers 24 will perform the same functions as dorsal vertical stabilizers 16. However, in the preferred embodiment, Ventral vertical stabilizers 24 will be contained within craft 1 in a retracted position 25 and may be extended out through lower surface 3 to a deployed position 26 when needed. Rear landing gear 27 may be combined with or used independently of ventral vertical stabilizers 24. Forward landing gear 28 is also preferably provided. Forward landing gear 28 should also have a retracted position within craft 1 and a deployed position 29 wherein it will depend from lower surface 3. Landing gear 27 and 28 may be wheels, skids, or any other conventional landing gear mechanism.

Landing gear 27 and 28 are not necessary for the landing of craft 1. Craft 1 is ideally suited to water landings. Lower surface 3 has a shape resembling the hull of a boat. Craft 1 should be airtight, and should float or should be easily made to float. Thus, craft 1 may take off or land in the same fashion as a standard sea plane. When craft 1 is used as a reentry vehicle, sea plane style water landings may be preferable as they will avoid the need to include openings in lower surface 3. This may be desirable since any opening represents a potential failure point during the extreme stresses of reentry.

When lifting craft 1 is used for atmospheric flight, it may be used a glider; however, it will preferably be provided with a thrust source 22 such as an air breathing jet engine, a propeller engine, or other conventional thrust sources. When thrust source 22 is a jet engine, thrust source 22 is preferably centrally located within craft 1 with its exhaust end centrally located at tail 5. A propulsion module bay 32 with a propulsion module bay door 33 in upper surface 2 is preferably provided to allow access to thrust source 22 and propulsion module bay 32.

Thrust source 22 is preferably mounted within an interchangeable propulsion module. Propulsion module will preferably be provided with standardized interchange connections to allow one propulsion module to be easily removed and replaced with another.

When thrust source 22 is an air breathing engine, air intake passage(s) preferably lead from the engine to one or more air intake apertures 60 preferably located in upper surface 2. One or more fuel tanks 50 are also preferably provided within craft 1 for thrust source 22. In one preferred embodiment, fuel tanks 50 will be located on each side of craft 2 generally parallel to edges 11, but running along and conforming to the inner surface of lower surface 3. A power take off or PTO shaft will preferably be provided from thrust source 22 to provide mechanical power to other items in craft 1 such as modules 30, discussed below. PTO is expected to be particularly useful for military applications such as atmospheric weapons.

Although thrust source 22 may certainly be used when craft 1 is used as a reentry vehicle, operators may find it useful to omit thrust source 22 and fuel tank 50 and to operate craft 1 as a glider in some circumstances. Room and weight are at a premium on any flight into space. Eliminating fuel tank 50 and thrust source 22 will allow the space they would have occupied to be used for other mission objectives.

In the preferred embodiment, craft 1 is provided with one or more internal inter-changeable modules 30. Modules 30 may include supply modules, crew ferry modules, laboratory modules, habitation modules (pressurable modules), propulsion modules, orbital maneuvering modules, medical evacuation module, fuel modules, control modules, payload modules, rescue and escape modules, tanker modules, weapons modules (for atmospheric or orbital applications). Modules 30 may be used to ferry crew and cargo between craft 1 and other craft such as the international space station and the like. Modules 30 are preferably rendered interchangeable by providing each with a standardized frame and standardized fittings and adaptors. Modules 30 may be of any size or configuration that can be mounted within the interior of a particular craft 1. Preferably, the fittings and adaptors should be standardized so that modules 30 may be moved from one craft 1 to another. By fitting the interior of craft 1 to receive modules 30, the function of craft 1 may be varied easily without requiring significant reconstructive efforts.

In the preferred embodiment, craft 1 is provided with an openable cargo bay door 31 in upper surface 2. Cargo bay door 31 should be sized to allow modules 30 to pass through when cargo bay door 31 is open. In the preferred embodiment, cargo modules are contemplated to be about 8 ft.×8 ft.×6 ft.; however, this may change depending upon the size of craft 1 utilized. Dimensions may also vary depending upon the purposes to which other modules 30 are put.

Craft 1 is preferably provided with rail systems on which modules 30 may be mounted and deployed within craft 1. This will allow modules 30 to be positioned within craft 1 through cargo bay door 31 or any access hatches and readily deployed or inserted during orbit.

One of modules 30 will preferably be a control module 34. Although craft 1 may be an unmanned craft, when it is piloted, it is contemplated that the pilot and crew will be positioned in a control module 34 positioned proximate to nose 4 of craft 1. Like all modules 30, control modules 34 are provided with standardized frames, adaptors, and connectors, to facilitate their interchangeability. In the preferred embodiment, control modules 34 are readily installed, deployed, or exchanged, whether in the field or on orbit, through access hatch 81. Control modules 34 may include manned crew cockpit modules for space mission operations, military cockpit modules for space or atmospheric operations, unmanned aerial vehicle or unmanned combat aerial vehicle control modules, and unmanned science modules.

The instruments and controls needed to pilot craft 1 as well as communication and other equipment desirable for the operation of craft 1 should be located in control module 34 and interfaced with the other (preferably modular) systems of craft 1.

Control module 34 should preferably be provided with a transparent window to allow the pilot to see to fly and land craft 1. The transparent window in control module 34 may align with a transparent section in lower surface 3, nose 4, and/or upper surface 2. Alternatively, control module 34 may be configured to be mechanically raised and lowered to locate the transparent window above upper surface 2 and to enhance pilot visibility. Craft 1 will preferably be provided with a control module hatch 81 in upper surface 2 which is sized to allow control module 34 to be added and removed.

Control modules 34 may also offer safety options for craft 1 and its crew. Control module 34 may be configured to be ejected from craft 1, preferably with explosives. If problems develop with craft 1 during launch, orbit, reentry or flight which appear likely to result in the failure of craft 1, the crew may escape by ejecting control module 34. Control module 34 preferably will be provided with cone drogue stabilization, one or more parachutes and a heat resistant outer surface comprised of a spherical section ablative heat shield, not unlike the Gemini or Apollo capsules. These features will increase the chances of control module 34 and its crew surviving a ballistic reentry.

Control module 34 may also be included within another module 30, and carried within the cargo area of craft 1. In this embodiment, the control module 34 positioned within module 30 should preferably be positioned to allow its primary hatch 65 to mate with secondary hatch 66 (described below) of the control module 34 located proximate to nose 4 of craft 1, preferably via transfer tunnels 36 (described below). Control module 34 should also preferably be positioned to align secondary hatch 66 with upper surface 2 of craft 1, whereby hatch 66 may be accessible when cargo bay doors 31 are open. In this configuration, control module 34 may be used for crew rescue or crew transfer missions while still providing the same emergency abort and safety options as when control module 34 is positioned proximate to nose 4.

Another potential use of modules 30 would be as an emergency medical evacuation and emergency crew rescue module 35. Evacuation module 35 is a pressurized crew habitation module containing life support capabilities. Evacuation module 35 should be airtight and pressurized and should contain oxygen and preferably water, food, and medical supplies.

Modules 30 should preferably be provided with sealable transfer tunnels 36 connecting modules 30 to each other. Tunnels 36 will allow crew members to access the different modules 30 as needed. However, tunnels 36 should be sealable so that crew members can separate one module 30 from another. Sealing may be accomplished with hatches or other conventional closures for providing airtight seals between compartments. Manned modules should preferably be provided with docking hatch 38*a*, discussed below, and secondary hatch 66 which provides access to the inter-modular transfer tunnels 36.

In the event of a medical emergency aboard the International Space Station or other orbital vehicle or facility, evacuation module 35 could be sent up in craft 1, together with medical staff. Craft 1 would rendezvous and preferably dock with the orbital craft or facility containing the endangered crew using docking hatch 38*a*.

The medical rescue crew would either already be in the evacuation module or would transfer to it from other portions of craft 1 via transfer tunnel 36. If necessary, the rescue crew would enter the other craft to retrieve the endangered crew. The rescue crew could attend to the evacuated crew in the evacuation module during the return to Earth. The reentry and flight flexibility of craft 1 will enable return directly to appropriate medical facilities on Earth.

Craft 1 may be provided with a module 30 containing an articulable robotic arm 37 for use in space. In a preferred embodiment, module 30 containing robotic arm 37 may be mounted in propulsion module bay 32. When propulsion module bay door 33 is opened, robotic arm 37 may be deployed. The distal end of robotic arm 37 may be provided with a clamp or other operational tools. Robotic arm 37 could be used to move modules 30 or other payload out of or into craft 1 or out of or into other vehicles or space facilities. Robotic arm 37 could be used to capture or launch satellites or other orbital objects. Robotic arm 37 may also be provided with one or more cameras that would allow the crew of craft 1 to visually inspect the interior or exterior of craft 1 while craft 1 was in orbit.

Particularly when craft 1 is intended for space flight and most particularly when it is intended to dock with the international space station or other space vehicles, craft 1 may be provided with a docking hatch 38 configured to engage the space station via one of the station's pressurized docking adaptors. In one embodiment of craft 1, docking hatch 38 is preferably provided in upper surface 2 proximate to nose 1 and directly over control module 34 and interfaced with primary hatch 65 providing access to control module 34. An alternate or additional docking hatch 38*a* may be incorporated in the upper surface of a module 30. When module 30 is positioned within craft 1 below cargo bay door 31, cargo bay door 31 may be opened to provide access to docking hatch 38*a*. When module 30 is used a crew transfer module, crew members may enter and exit craft 1 through docking hatch 38*a* without having to pass through the remainder of craft 1. Similarly, when module 30 is used to transfer cargo or supplies, they may be loaded or offloaded directly into module 30 without passing through the remainder of craft 1.

When craft 1 is intended for space flight and/or reentry, it will preferably be provided with one or more orbital thrust sources 39. These will typically include a rocket engine 40 located in the stern of craft 1 proximate to tail 5. Rocket engine 40 will preferably be contained within an interchangeable module 30, like the rest of the hardware in craft 1. Rocket engine 40 will preferably be provided with a gimbaled mounting allowing the thrust of the engine to be swivelled on two different axes.

Orbital thrust sources 39 may also include a reaction control system 41 such as a pressurized gas jet or miniature bi-propellant rocket positioned at other locations on craft 1, such as nose 4. Reaction control system 41 will also preferably be contained in interchangeable modules 30. By activating reaction control systems 41, rocket engine 40 or other orbital thrust sources 39 with which craft 1 may be provided, craft 1 may be maneuvered in space for orbital adjustments, engaging satellites, the international space station, or other craft on orbit or for de-orbit.

Orbital thrust sources 39 may also be used to stabilize craft 1 during reentry. As noted above, during the initial stages of reentry, the atmosphere is relatively thin, making it difficult for the control surfaces of craft 1 to effectively steer craft 1. Orbital thrust sources 39 may be activated as necessary to keep craft 1 oriented properly. Preferably, the activation of orbital thrust sources 39 will be computer controlled during reentry.

When craft 1 is used for space flight, it will preferably be carried inside another craft, as discussed more fully below. However, craft 1 may be launched into orbit using conventional rockets 43 such as the multi-stage solid rocket boosters currently used for satellite or space shuttle launches, although other rocket designs, such as liquid rockets or single stage rockets, could be used if desired.

Where rockets 43 are used to launch craft 1, rockets 43 will be jettisoned once they are expended. Payload assistance or orbital maneuver system (OMS) liquid fueled rockets 42 will preferably remain after launch rockets 43 have been jettisoned. OMS rockets 42 may be used to bring craft 1 into a higher or lower orbit or to de-orbit. OMS rockets 42 may be used in place of or in conjunction with orbital thrust sources 39. However, once craft 1 has been properly positioned for de-orbit, OMS rockets 42 or other strap on rockets will preferably be jettisoned. OMS rockets 42 and other strap on rockets can be used either for retrograde (opposite the direction of travel) or posigrade (in the direction of travel) applications.

OMS rockets 42 or other strap on solid rockets may also be used to abort a launch. If problems develop while craft 1 is being launched or while solid rockets 43 are still on the launch pad, OMS rockets 42 may be fired to effect separation between craft 1 and rockets 43. Once separation is achieved, OMS rockets 42 may be jettisoned and craft 1 landed in the conventional manner.

The design of craft 1 is particularly well suited for reentry. Lower surface 3 presents a wide blunt surface to the atmosphere upon reentry. Such a surface will result in craft 1 slowing relatively quickly. It will also cause a large plasma shock wave to build up in front of descending craft 1 as it passes through the upper portions of the atmosphere. This shock wave will shield craft 1 from much of the heat of reentry.

Craft 1 will preferably be made by winding a gelatinous fabric comprising silicon nitride, carbon fibers and a high temperature thermal setting resin or other equivalent materials about a preformed mandrel, similar to the way that composite rocket booster casings are manufactured. In one preferred embodiment, the mandrel assembly will include ribs; stiffeners; honeycomb panels; hardpoint subassemblies; and mounting adapters for hatches, fins, landing gear and modules 30. When the winding is complete and the fabric layers are cured, the entire airframe or aeroshell will become a single unit contained within a strong, rigid, and continuous outer shell that should be suitable for the stresses of flight and reentry. Thus, in one preferred embodiment of craft 1, the outer surface of lower surface 3 may present a single unbroken aeroshell 51 for craft 1. Hatches and penetrations of aeroshell 51 are preferably confined to upper surface 2, where they are not subject to maximum reentry thermal and pressure loads. Any penetrations of lower surface 3 are preferably kept small and should preferably be isolated from the remainder of the interior of craft 1 with sealed bays.

The absence of any breaks in lower surface 3 will decrease the number of potential failure points in aeroshell 51. Also, the doubly convex shape of the leading portion of aeroshell 51 is well suited for distributing the force of any blows aeroshell 51 may receive during flight. This is particularly important because of the ever increasing amount of "space junk" orbiting the planet. The extreme velocity of all orbiting bodies makes the risk of collision with such items a real and growing danger, which should preferably be taken into account in designing orbital vehicles.

A second preferred craft design is disclosed herein. Although this second design may be used independently, one contemplated purpose is as a launch craft 101 for craft 1 when craft 1 is launched in a two stage system.

Like craft 1, launch craft 101 is preferably a lifting body aircraft having an upper surface 102 and a lower surface 103. Upper surface 102 extends from the nose 104 to the tail 105 of craft 101. The length of craft 101 is that dimension extending from nose 104 to tail 105, excluding any elevons 302, 303 which may be provided at the tail end or aft end 107 of craft 101.

Lower surface 103 has a first half 108 extending from nose 104 to about the longitudinal center line 109 of craft 101. The longitudinal center line 109 of craft 101 is determined by a plane severing craft 101 perpendicular to the length of craft 101 at the half way point between nose 104 and tail 105. Lower surface 103 also has a second half 110 extending from about longitudinal center line 109 to tail 105.

Between upper surface 102 and lower surface 103 is a pair of chines 111 extending from nose 104 toward tail 105. Chines 111 each consist of a substantially flat surface preferably provided at an angle of about twenty-five degrees to upper surface 102. Though discussed with respect to craft 101, chines 111 could be incorporated into craft 1 if desired.

Chines 111 will dampen the roll impetus of craft 101. Like craft 1, craft 101 will be far more inclined to roll than to yaw, such that a yaw will be difficult to produce without the pilot actively trying to do so. This inclination to roll rather than yaw will make craft 101 easier to control, for the same reasons discussed above with respect to craft 1. However, the inclination of any craft to roll can make it overly-sensitive to roll inducing stimulus such that roll in excess of that desired by the pilot may by experienced. By dampening roll impetus, chines 111 will make craft 101 more stable and more proportionally responsive to pilot input.

Chines 111 will dampen the roll impetus of craft 1 in two principle ways. Chines 111 will present a broad flat surface that must be moved through the air in any roll of craft 101. This surface will provide resistance to any roll of craft 101, helping prevent craft 101 from rolling excessively.

In addition, chines 111 will direct air along the surfaces of chines 111 as craft 101 moves forward. This airflow will generate pressure normal to the surface of chines 111. Ordinarily, these pressures cancel each other out, as they are equal and opposing. However, when craft 111 rolls as it goes through a turn, one chine 111 will be on the leading side or outside of craft 101 and the other chine 111 will be on the trailing side or inside during the turn. The chine 111 on the trailing side will experience a reduction in air flow traveling over it, relative to the chine 111 on the leading side during the turn. This difference in air flow will arise because the chine 111 on the trailing side will be shielded by the body of craft 101 during the turn. The difference in air flow will result in a difference in the pressures exerted on each chine 111 during the turn. This difference in pressure combined with the negative roll moment, discussed above, will help craft 101 recover from any roll—i.e., return to level flight.

Aft of longitudinal center line 109, upper surface 102 preferably angles toward lower surface 103 at an angle of about eight degrees relative to the portion of upper surface 102 forward of longitudinal center line 109.

Upper surface 102 has a pair of edges 112 that extend from nose 104 to tail 105 such that nose 104, edges 112, and tail 105 demark upper surface 102. Lower surface 103 also has a pair of edges 113 that extend from nose 104 to tail 105. Upper edges 112 and lower edges 113 also preferably demark the boundaries of chines 111. Where chines 111 do not extend all the way to nose 104 or tail 105, edges 112 and 113 may merge into a single edge.

The width of craft 101 is the longest dimension between lower edges 113 that is also perpendicular to the length of craft 101.

Like craft 1, the first half 108 of lower surface 103 of craft 101 is preferably doubly convex, meaning that it is convex in the dimension between nose 104 and longitudinal center line 109 as well as between lower edges 113. This will provide craft 101 with an enlarged front end, which will maximize the displacement of air over lower surface 103, thereby increasing pressure below craft 101. As with craft 1, the enlarged front end of craft 101 will allow the shuttlecock effect to be achieved by positioning the center of gravity of craft 101 forward of longitudinal center line 109.

Second half 110 of lower surface 103 has a central section 123 and side sections 114. Central section 123 extends from about longitudinal center line 109 to tail 105. The width of central section 123 is preferably about seventy-five percent of the width of craft 101. Central section 123 is preferably substantially flat rather than curved and should preferably extend toward tail 105 at an angle of about ten degrees with respect to a horizontal dimension substantially parallel to upper surface 102.

Side sections 114 extend from lower edges 113 to central section 123. In the preferred embodiment, side sections 114 curve smoothly and continuously from lower edge 113 to central section 123.

As with craft 1, upper surface 102 is preferably as flat as practical from nose 104 to tail 105, preferably with a curvature of about three to five degrees or less. As discussed above, in the preferred embodiment, upper surface 102 tapers toward lower surface 103 from longitudinal center line 109 to tail end 105. However, upper surface 102 is still preferably substantially flat between nose 104 and longitudinal center line 109 and between longitudinal center line 109 and tail 105.

Upper surface 102 and lower surface 103 are preferably provided with a pair of elevons 302 and 303. Elevons 302 and 303 have an open position 304 and a closed position 305. In closed position 305, elevons 302 and 303 come together to form a drag reducing airfoil 306 at the tail end 105 of craft 101. Elevons 302 and 303 may each be moved from closed position 304 to open position 305 independently from the other. By moving one elevon to open position 305 and leaving the other elevon in closed position 304, elevons 302, 303 can be used to control the attitude of craft 101. If both elevons 302, 303 are moved to open position 305, elevons 302, 303 will serve as an airbrake.

Each elevon 302 and 303 may be comprised of separately operable port and starboard components or elevons 302 and 303 may each be unitary flaps. When elevons 302 and 303 are comprised of separate starboard and port components, the starboard or port component of each may be moved to open position 305 separately from the other components. Doing so will cause craft 101 to roll. As discussed above in the context of craft 1, when only one of the port or starboard components of elevons 302 or 303 are opened, the impetus will be to yaw. However, craft 101 has a strong resistance to yaw and low resistance to roll—though chines 111 will provide some roll resistance, it will be quite small relative to the resistance provided by conventional wings. As with craft 1, this combination will result in the yaw impetus being manifested as a roll in craft 101.

Craft 101 will also preferably be provided with a plurality of vertical stabilizers 401. Stabilizers 401 may be dorsal, ventral or both, and will serve substantially the same function in craft 101 as stabilizers 16, 24 perform in craft 1.

In the preferred embodiment of craft 101, vertical stabilizers 401 have a base 403 an upper end 404 opposite base 403, a leading edge 405, and a trailing edge 406. In the preferred embodiment, bases 403 of each stabilizer 401 are positioned along edge 112 beginning proximate tail 105 and extending toward nose 104 a distance equal to about twenty-five percent of the length of craft 101. Dorsal vertical stabilizers 401 are preferably angled outward from base 403 to upper end 404 at about ten degrees with respect to vertical. In the preferred embodiment, upper end 404 is about sixty percent the length of base 403. Leading edge 405 is preferably angled at about twenty to thirty degrees and most preferably at about twenty-seven degrees to the horizontal and trailing edge 406 is preferably generally perpendicular to the horizontal. In the preferred embodiment, dorsal vertical stabilizers 401 preferably extend about ten feet above upper surface 102 of craft 101, although the preferred size of dorsal vertical stabilizers 401 will obviously vary relative to the size of craft 101.

As with craft 1, one or more stabilizers 401 may be provided with rudders 402 at trailing edge 406. Rudders 402 will perform substantially the same function in craft 101 as rudders 21 performed in craft 1.

Retractable ventral vertical stabilizers 401 may be provided in substantially the same manner described above with respect to craft 1. Alternatively, ventral vertical stabilizers 401 may be configured to fold down flat against lower surface 103, in the same manner described above with respect to dorsal vertical stabilizers 16. Ventral vertical stabilizers 401 may, of course, be fixed as well. Whether ventral vertical stabilizers 401 are fixed, retractable, foldable or otherwise configured, they may be provided with landing gear as in craft 1 above.

The preferred embodiment of craft 101 has a length to width to depth ratio of about 5:3:1. This ratio will enhance the cargo capacity of craft 101 relative to that of craft 1. This ratio is also expected to provide a better lift to drag ratio than the 4:2:1 ratio of craft 1.

It will be appreciated that the design of craft 101 is fully scalable such that a lifting body aircraft of any size could be made according to the ratio and teachings provided herein. However, in the preferred embodiment, craft 101 is one hundred twenty feet long, seventy-two feet wide, and twenty-four feet deep. Providing craft 101 with these dimensions will facilitate the use of craft 101 to carry craft 1 toward orbit.

As noted above, in one preferred embodiment, craft 101 will be used to carry craft 1 toward orbit. Craft 1 will preferably be contained inside craft 101. In this embodiment, craft 101 will preferably be provided with a cargo bay door 601. Door 601 will preferably comprise an upper panel 602 and a lower panel 603. Upper panel 602 will be positioned in upper surface 102 and lower panel 603 will be positioned in lower surface 103. Where door 601 is provided, elevons 302, 303 will preferably be positioned at the distal ends of panels 602 and 603. When door 601 is closed, elevons 302, 303 can be used as described above. However, when door 601 is open, elevons 302, 303 can be manipulated to minimize the turbulence experienced by anything exiting craft 101 via cargo bay door 601. Upper panel 602 and lower panel 603 may also serve as control surfaces of craft 101, and will provide additional braking and pitch control When craft 101 is used as a launch vehicle, craft 101 will preferably be propelled by one or more rockets to the point where craft 1 will separate from craft 101. The rockets will carry craft 101 to an altitude of about one hundred twenty kilometers and a velocity of about mach 3.

At the peak elevation, cargo bay door 601 will open. A port 501 at tail end 105 of craft 101 will open, providing access to cargo bay 502 where craft 1 will preferably be stored. Craft 1 will exit craft 101 via port 501, passing between open panels 602 and 603. Exiting craft 101 in this fashion will allow craft 1 to depart within the large shock wave that craft 101 will create. This will help shield craft 1 from the stresses inherent in essentially beginning its journey at mach 3, relative to the surrounding environment.

Once separation is complete, craft 1 will proceed to orbit under its own power, and craft 101 will return to Earth. The design of craft 101 will create a large shock wave before it during reentry. This shock wave will serve to disperse a significant amount of heat generated by the friction of reentry, and will help to decelerate craft 101. As craft 101 reaches denser portions of the atmosphere, elevons 302 and 303 may be deployed for use as airbrakes until craft 101 has reached a manageable velocity.

By providing craft 101 with landing gear either on ventral stabilizers 401 or elsewhere, craft 101 can be landed on land. However, the hull of craft 101 is ideally suited for landing on water. Where a water landing is desired, ventral stabilizers 401 are preferably retractable or omitted. Craft 101 may take off from water or land in a similar fashion, particularly where craft 101 is not intended as an orbital launch vehicle for craft 1.

As noted above, the craft 101 may be scaled up or down as desired. In one preferred embodiment, craft 101 is configured as an unmanned aerial vehicle (UAV) and is sized to be carried in or as a backpack. Preferred dimensions of this version of craft 101 are twenty-four inches×sixteen inches× four inches. In the backpack version of craft 101, a thrust source 222 is preferably provided proximate tail 105. Thrust source 222 preferably includes a propeller 223 and a motor and fuel or power source contained within the body of craft 101. In the preferred embodiment, upper and lower surfaces 102, 103 are recessed to provide a place to mount thrust source 222 between vertical stabilizers 401. This will diminish the ability of the tail 105 of craft 101 to form a drag reducing airfoil. However, elevons 302, 303 are preferably provided at tail 105 aft of propeller 223 to control craft 101.

Other conventional engines may, of course, be used for thrust source 222 when desired. When craft 101 is used as a launch vehicle for craft 1, thrust source 222 will preferably comprise a rocket or jet engine.

When craft 101 is used as a UAV application, it will preferably be provided with a cargo hold 701, which is most preferably positioned forward of longitudinal center line 109. A cargo port 702 is preferably provided in upper surface 102 to provide access to cargo hold 701. In one application, cargo port 702 may be provided with a transparent covering. This will allow a camera to be included in cargo hold 701, so that craft 101 may be used for reconnaissance or observation. A similar port 702 could be provided in lower surface 103 to allow convenient observation of the terrain below craft 101. Alternatively, craft 101 is equally stable flying upside down as right side up. Craft 101 may be inverted to allow observation of the surface below craft 101 through port 702 in upper surface 101. Still another option would be to make the entire nose portion of craft 101 transparent, or transparent to the appropriate wavelength of light, so that a full three hundred sixty degree field of vision may be obtained by the camera in craft 1. The camera could be configured to record the images it takes, transmit them to a remote receiver, or both.

Obviously, when a UAV version of craft 101 is used, craft 101 will need to be provided with a means for receiving EMF signals, a processor for rendering those signals into actionable mechanical commands, and a mechanical structure for imparting those commands to the control surfaces and thrust source 222 of craft 101 as well as to the camera or other on board equipment craft 101 might be configured to carry. Alternatively, the flight and operational instructions of craft 101 may be pre-programmed so that no in-flight commands will need to be provided to craft 101. For example, craft 101 may be provided with a global positioning system (GPS) transponder and programmed to follow a pre-set navigational route based on GPS coordinates. The operational details of both remote and programmed control of UAV's are well known in the UAV field and are, thus, not discussed in detail here.

UAV version of craft 101 is suited to a variety of applications. Law enforcement could use it to observe and clock motorists who might be speeding. Security agencies could use craft 101 as an unmanned observation platform from which to keep watch over remote areas or places where a physical human presence is impractical. Scientists may use craft 101 for the same purpose. UAV versions of craft 101 will be useful to military bodies for reconnaissance. Craft 101 may also be fitted with weapons or munitions to allow it to be used for offensive or defensive military purposes.

The ability of craft 101 to land on water will facilitate its use by naval bodies. The ease with which craft 101 can be flown, and particularly its natural inclination to recover from a stall and rolls as well as its strong resistance to yawing, makes craft 101 well suited for general operation, both in manned and unmanned embodiments. In particular, it will be appreciated that the natural inclination of craft 101 to return to level flight will make both its in air operation and its landing much easier for the novice pilot or operator to master.

Craft 101 will preferably be constructed in same manner as craft 1, by winding a gelatinous fabric comprising silicon nitride, carbon fibers and a high temperature thermal setting resin or other equivalent materials about a preformed mandrel, similar to the way that composite rocket booster casings are manufactured. Such construction techniques are believed to be particularly well suited for producing a craft 101 that has a very small radar signature, which may be useful when craft 101 is used for military purposes. Where a small radar signature is desired, thrust source 222 may further comprise a carbon shield 224 for propeller 223. Other conventional construction techniques may, of course, be used if desired.

Other uses and embodiments of the invention, equivalent to those disclosed herein, will occur to those skilled in the art, and are intended to be included within the scope and spirit of the following claims.

I claim:

1. A lifting body aircraft having a length, a width, a depth, and a longitudinal center line, said aircraft comprising:
    a substantially flat upper surface having a nose end and a tail end and edges extending therebetween;
    a lower surface having a first section and a second section, said first section extending from said nose end and said edges of said upper surface to about said longitudinal center line of said aircraft, said first section being convex between said nose end and said longitudinal center line and between said edges of said upper surface, said second section extending from said tail end of said upper surface to about said longitudinal center line of said aircraft, said second section having a substantially flat central section, whereby said second section of said lower surface and said tail end of said upper surface form a drag reducing airfoil; and wherein said aircraft has a center of gravity forward of said longitudinal center line.

2. A lifting body aircraft according to claim 1 wherein said center of gravity is forward of said longitudinal center line by a distance of about five percent of said length of said aircraft.

3. A lifting body aircraft according to claim 1 wherein the ratio of said length to said width is about 4:2.

4. A lifting body aircraft according to claim 1 wherein the ratio of said length to said depth is about 4:1.

5. A lifting body aircraft according to claim 1 wherein the ratio of said length to said width and to said depth is about 4:2:1.

6. A lifting body aircraft according to claim 1 further comprising a plurality of vertical stabilizers extending from said craft proximate to said tail end.

7. A lifting body aircraft according to claim 1 further comprising an elevon at said tail end of said upper surface.

8. A lifting body aircraft according to claim 1 wherein said lower surface further comprises an elevon proximate to said tail end of said upper surface.

9. A lifting body aircraft according to claim 1 further comprising a thrust source configured to provide thrust to aircraft 1.

10. A lifting body aircraft according to claim 9 wherein said thrust source is a jet engine.

11. A lifting body aircraft according to claim 9 wherein said thrust source is a rocket.

12. A lifting body aircraft having a longitudinal center line, said aircraft comprising:
a substantially flat upper surface having a nose end and a tail end and a pair of substantially parallel upper edges extending therebetween;
a chine depending from each upper edge, said chine comprising a broad flat surface extending outward at an angle from each upper edge to a lower edge extending from said nose toward said tail end;
a lower surface having a first section and a second section, said first section extending from said nose end to about said longitudinal center line of said aircraft, said first section being convex between said nose end and said longitudinal center line and between said lower edges of said chines, said second section extending from said tail end of said upper surface to about said longitudinal center line of said aircraft, said second section having a substantially flat central section, whereby said second section of said lower surface and said tail end of said upper surface form a drag reducing airfoil.

13. A lifting body aircraft according to claim 12 having a length, a width, a depth, and an interior.

14. A lifting body aircraft according to claim 13 wherein said aircraft is provided with an upper door panel in said tail end of said upper surface and a lower door panel in said second section of said lower surface, said door panels each having distal ends, each said door panel having a closed position and an open position, wherein said door panels are configured to position said distal ends of said door panels proximate to each other when said upper door panel and said lower door panel are in said closed positions.

15. A lifting body aircraft according to claim 14 wherein said upper door panel and said lower door panel are configured to provide passage to said interior of said lifting body aircraft when said door panels are in said open position.

16. A lifting body aircraft according to claim 15 further comprising a second lifting body aircraft positioned within said interior of said first lifting body aircraft, said second lifting body aircraft sized and configured to be discharged from said first lifting body aircraft through said passage provided when said elevons are in said open position.

17. A lifting body aircraft according to claim 14 further comprising at least one elevon extending from said distal end of at least one of said door panels.

18. A lifting body aircraft according to claim 13 having a center of gravity forward of said longitudinal center line.

19. A lifting body aircraft according to claim 18 wherein said center of gravity is forward of said longitudinal center line by a distance of about five percent of said length of said aircraft.

20. A lifting body aircraft according to claim 13 wherein the ratio of said length to said width is about 5:3.

21. A lifting body aircraft according to claim 13 wherein the ratio of said length to said depth is about 5:1.

22. A lifting body aircraft according to claim 13 wherein the ratio of said length to said width and to said depth is about 5:3:1.

23. A lifting body aircraft according to claim 12 further comprising a plurality of vertical stabilizers extending from said craft proximate to said tail end.

24. A lifting body aircraft according to claim 12 wherein the width of each chine between the upper edge and the lower edge of the aircraft is sufficient to generate air pressure normal to the surface of the chine.

25. A lifting body aircraft according to claim 24, wherein the chines are positioned such that one chine will be on the leading side of the aircraft while the other chine will be on the trailing side of the aircraft, when the aircraft rolls as it goes through a turn.

26. A lifting body aircraft according to claim 25 wherein the chine on the trailing side of the aircraft will experience a reduction in air flow traveling over it, relative to the chine on the leading side of the aircraft, wherein the difference in air flow will result in a difference in the pressures exerted on each chine during the turn, sufficient to bias the aircraft to recover from the roll.

27. A lifting body aircraft having a longitudinal center line, said aircraft comprising:
a substantially flat upper surface having a nose end and a tail end and a pair of substantially parallel upper edges extending therebetween;
a chine depending from each upper edge, said chine comprising a broad flat surface extending outward at an angle from each upper edge to a lower edge extending from said nose toward said tail end;
a lower surface having a first section and a second section, said first section extending from said nose end to about said longitudinal center line of said aircraft, said first section being convex between said nose end and said longitudinal center line and between said lower edges of said chines, said second section extending from said tail end of said upper surface to about said longitudinal center line of said aircraft.

28. A lifting body aircraft according to claim 27 wherein said aircraft is an unmanned aerial vehicle.

29. A lifting body aircraft according to claim 28 wherein said aircraft is further provided with a thrust source.

30. A lifting body aircraft according to claim 29 wherein said thrust source is mounted at said tail end.

31. A lifting body aircraft according to claim according to claim 30 wherein said thrust source comprises a propeller.

32. A lifting body aircraft according to claim 27 wherein the width of each chine between the upper edge and the lower edge of the aircraft is sufficient to generate air pressure normal to the surface of the chine.

33. A lifting body aircraft according to claim 32, wherein the chines are positioned such that one chine will be on the leading side of the aircraft and the other chine will be on the trailing side of the aircraft, when the aircraft rolls as it goes through a turn.

34. A lifting body aircraft according to claim 33 wherein the chine on the trailing side of the aircraft will experience a reduction in air flow traveling over it, relative to the chine on the leading side of the aircraft, wherein the difference in air flow will result in a difference in the pressures exerted on each chine during the turn, sufficient to bias the aircraft to recover from the roll.

* * * * *